United States Patent
Wheatley et al.

(10) Patent No.: US 6,451,414 B1
(45) Date of Patent: Sep. 17, 2002

(54) MULTILAYER INFRARED REFLECTING OPTICAL BODY

(75) Inventors: John A. Wheatley, Lake Elmo; Andrew J. Ouderkirk, Woodbury, both of MN (US)

(73) Assignee: 3M Innovatives Properties Company, St. Paul, MN (US)

( * ) Notice: Subject to any disclaimer, the term of this patent is extended or adjusted under 35 U.S.C. 154(b) by 0 days.

(21) Appl. No.: 09/447,336

(22) Filed: Nov. 22, 1999

Related U.S. Application Data

(62) Division of application No. 09/005,727, filed on Jan. 13, 1998.

(51) Int. Cl.[7] .............................................. B32B 7/02
(52) U.S. Cl. .................. 428/212; 428/910; 359/359; 359/584; 359/590
(58) Field of Search ............................... 428/212, 910; 359/359, 584, 590

(56) References Cited

U.S. PATENT DOCUMENTS

| | | | |
|---|---|---|---|
| 3,124,639 A | 3/1964 | Kahn | 88/65 |
| 3,247,392 A | 4/1966 | Thelen | 250/226 |
| 3,432,225 A | 3/1969 | Rock | 350/164 |
| 3,610,729 A | 10/1971 | Rogers | 350/157 |
| 3,711,176 A | 1/1973 | Alfrey, Jr. et al. | 350/1 |
| 3,773,882 A | 11/1973 | Schrenk | 264/171 |
| 3,860,036 A | 1/1975 | Newman, Jr. | 138/45 |
| 3,884,606 A | 5/1975 | Schrenk | 425/133.5 |
| 4,229,066 A | 10/1980 | Rancourt et al. | 350/1.6 |
| 4,389,452 A | 6/1983 | Chahroudi et al. | 428/215 |
| 4,446,305 A | 5/1984 | Rogers et al. | 528/348 |
| 4,520,189 A | 5/1985 | Rogers et al. | 528/331 |
| 4,521,588 A | 6/1985 | Rogers et al. | 528/363 |
| 4,525,413 A | 6/1985 | Rogers et al. | 428/212 |
| 4,705,356 A | 11/1987 | Berning et al. | 350/166 |
| 4,720,426 A | 1/1988 | Englert et al. | 428/344 |
| 4,779,745 A | 10/1988 | Prendergast et al. | 211/59.2 |
| 4,788,128 A | 11/1988 | Barlow | 430/200 |
| 4,799,745 A | 1/1989 | Meyer et al. | 350/1.7 |

(List continued on next page.)

FOREIGN PATENT DOCUMENTS

| | | | |
|---|---|---|---|
| EP | 080 182 | 4/1987 | G02B/5/28 |
| WO | WO 95/27919 | 4/1995 | G02B/27/28 |
| WO | WO 95/17303 | 6/1995 | B32B/7/02 |

(List continued on next page.)

OTHER PUBLICATIONS

Design of Three–Layer Equivalent Films, Journal of the Optical Society of America, vol. 68(I), 137, Jan. 5, 1978.

Alfrey, Jr. et al., Physical Optics of Iridescent Multilayered Plastic Films, Polymer Engineering and Science, vol. 9, No. 6, Nov. 1969.

Baumeister, Philip, Multilayer Reflections with Suppressed Higher Order Reflection Peaks, Applied Optics, vol. 31(10), pp. 1568, 1992.

(List continued on next page.)

*Primary Examiner*—Cynthia H. Kelly
*Assistant Examiner*—B. Shewareged
(74) *Attorney, Agent, or Firm*—Bruce E. Black

(57) ABSTRACT

An optical body comprising (a) a dielectric multilayer film having a reflecting band positioned to reflect infrared radiation of at least one polarization at an incident angle normal to the film, the reflecting band having a short wavelength bandedge $\lambda_{a0}$ and long wavelength bandedge $\lambda_{b0}$ at a normal incident angle, and a short wavelength bandedge $\lambda_{a\theta}$ and long wavelength bandedge $\lambda_{b\theta}$ at a maximum usage angle θ, wherein $\lambda_{a\theta}$ is less than $\lambda_{a0}$ and $\lambda_{a0}$ is selectively positioned at a wavelength greater than about 700 nm; and (b) at least one component which at least partially absorbs or reflects radiation in the wavelength region between $\lambda_{a\theta}$ and $\lambda_{a0}$ at a normal angle of incidence.

24 Claims, 6 Drawing Sheets

U.S. PATENT DOCUMENTS

| | | | |
|---|---|---|---|
| 4,912,083 A | 3/1990 | Chapman et al. | 503/227 |
| 4,937,134 A | 6/1990 | Schrenk et al. | 428/213 |
| 4,942,141 A | 7/1990 | DeBoer et al. | 503/227 |
| 4,948,776 A | 8/1990 | Evans et al. | 503/227 |
| 4,948,777 A | 8/1990 | Evans et al. | 503/227 |
| 4,950,639 A | 8/1990 | DeBoer et al. | 503/227 |
| 4,950,640 A | 8/1990 | Evans et al. | 503/227 |
| 4,952,552 A | 8/1990 | Chapman et al. | 503/227 |
| 4,973,572 A | 11/1990 | DeBoer | 503/227 |
| 5,019,480 A | 5/1991 | DeBoer et al. | 503/227 |
| 5,019,549 A | 5/1991 | Kellogg et al. | 503/227 |
| 5,034,303 A | 7/1991 | Evans et al. | 430/200 |
| 5,035,977 A | 7/1991 | DeBoer et al. | 430/200 |
| 5,036,040 A | 7/1991 | Chapman et al. | 503/227 |
| 5,037,977 A | 8/1991 | Tan et al. | 540/478 |
| 5,071,206 A | 12/1991 | Hood et al. | 359/360 |
| 5,095,210 A | 3/1992 | Wheatley et al. | 250/339 |
| 5,103,337 A | 4/1992 | Schrenk et al. | 359/359 |
| 5,122,905 A | 6/1992 | Wheatley et al. | 359/586 |
| 5,122,906 A | 6/1992 | Wheatley | 359/586 |
| 5,126,880 A | 6/1992 | Wheatley et al. | 359/587 |
| 5,149,578 A | 9/1992 | Wheatley et al. | 428/213 |
| 5,179,468 A | 1/1993 | Gasloli | 359/359 |
| 5,188,760 A | 2/1993 | Hikmet et al. | 252/299.01 |
| 5,193,737 A | 3/1993 | Carraher | 228/157 |
| 5,196,393 A | 3/1993 | Kubodera et al. | 503/227 |
| 5,211,878 A | 5/1993 | Reiffenrath et al. | 252/299.63 |
| 5,215,838 A | 6/1993 | Tam et al. | 430/41 |
| 5,233,465 A | 8/1993 | Wheatley et al. | 359/359 |
| 5,235,443 A | 8/1993 | Barnik et al. | 359/37 |
| 5,269,995 A | 12/1993 | Ramanathan et al. | 264/171 |
| 5,294,657 A | 3/1994 | Melendy et al. | 524/270 |
| 5,306,547 A | 4/1994 | Hood et al. | 428/213 |
| RE34,605 E | 5/1994 | Schrenk et al. | 359/359 |
| 5,316,703 A | 5/1994 | Schrenk | 264/1.3 |
| 5,319,478 A | 6/1994 | Fijnfschilling et al. | 359/53 |
| 5,360,659 A | 11/1994 | Arends et al. | 428/216 |
| 5,389,324 A | 2/1995 | Lewis et al. | 264/171 |
| 5,448,404 A | 9/1995 | Schrenk et al. | 359/584 |
| 5,486,935 A | 1/1996 | Kalmanash | 359/37 |
| 5,486,949 A | 1/1996 | Schrenk et al. | 359/498 |
| 5,540,978 A | 7/1996 | Schrenk | 428/212 |
| 5,568,316 A | 10/1996 | Schrenk et al. | 359/584 |
| 5,612,820 A | 3/1997 | Schrenk et al. | 359/498 |
| 5,629,055 A | 5/1997 | Revol et al. | 428/1 |
| 5,686,979 A | 11/1997 | Weber et al. | 349/96 |
| 5,699,188 A | 12/1997 | Gilbert et al. | 359/584 |
| 5,721,603 A | 2/1998 | De Vaan et al. | 349/194 |
| 5,744,534 A | 4/1998 | Ishiharada et al. | 524/442 |
| 5,751,388 A | 5/1998 | Larson | 349/96 |
| 5,767,935 A | 6/1998 | Ueda et al. | 349/112 |
| 5,770,306 A | 6/1998 | Suzuki et al. | 428/328 |
| 5,783,120 A | 7/1998 | Ouderkirk et al. | 264/134 |
| 5,793,456 A | 8/1998 | Broer et al. | 349/98 |
| 5,808,794 A | 9/1998 | Weber et al. | 359/487 |
| 5,825,542 A | 10/1998 | Cobb, Jr. et al. | 359/487 |
| 5,825,543 A | 10/1998 | Ouderkirk et al. | 359/494 |
| 5,830,376 A * | 11/1998 | Bohlke et al. | 216/65 |
| 5,882,774 A | 3/1999 | Jonza et al. | 428/212 |
| 5,940,149 A | 8/1999 | Vanderwerf | 349/5 |
| 5,962,114 A | 10/1999 | Jonza et al. | 428/212 |
| 5,965,247 A | 10/1999 | Jonza et al. | 428/212 |
| 6,024,455 A * | 2/2000 | O'Neill et al. | 359/530 |
| 6,049,419 A * | 4/2000 | Wheatley et al. | 359/359 |
| 6,117,530 A * | 9/2000 | Jonza et al. | 428/212 |

FOREIGN PATENT DOCUMENTS

| | | | |
|---|---|---|---|
| WO | WO 95/17691 | 6/1995 | G02B/5/30 |
| WO | WO 95/17692 | 6/1995 | G02B/5/30 |
| WO | WO 95/17699 | 6/1995 | G02F/1/1335 |
| WO | WO 96/19347 | 6/1996 | B32B/7/02 |
| WO | WO 97/01440 | 1/1997 | B32B/27/36 |
| WO | WO 97/01774 | 1/1997 | G02B/1/10 |
| WO | WO 99/36248 | 7/1999 | B29C/47/70 |
| WO | WO 99/36262 | 7/1999 | B32B/27/00 |

OTHER PUBLICATIONS

Boese, D. et al., Chain Orientation and Anisotropies in Optical and Dielectric Properties in Thin Films of Stiff Polyimides, J. Poly. Sci.: Part B, 30:1321 (1992).

Fabian, Juergen, Near–Infrared Absorbing Dyes Chemical Society, Hiroyuki Nakazumi and Masaru Matsuoka, 1992, American.

Floyd J. Green, The Sigma Aldrich Handbook of Stains, Dyes and Indicators, Aldrich Chemical Company, Inc., Milwaukee, WI ISBN 0–941633–22–5, 1991 (copy not provided).

Radford et al., Reflectivity of Iridescent Coextruded Multi-layered Plastic Films, Polymer Engineering and Science, vol. 13, No. 3, (May 1973); Dow Chemical Co., American Chemical Society Symposium on "Coextruded Plastic Films, Fibers, Composites", Apr. 9–14, 1972.

Schrenk et al., Nanolayer polymeric optical films, Tappi Journal, pp. 169–174, Jun., 1992.

Thelen, A, Multilayer Filters with Wide Transmittance Bands, Journal Optical Soc. Am., vol. 53(11), p. 1266–70 (Nov. 1963).

Zang, D.Y. et al., Giant anisotropies in the dielectric properties of quasi–epitaxial crystalline organic semiconductor thin films, Appl. Phys. Letters, 59:823 (1991).

* cited by examiner

MULTILAYER INFRARED REFLECTING OPTICAL BODY

This is a divisional of application Ser. No. 09/005,727 filed Jan. 13, 1998.

BACKGROUND OF THE INVENTION

The reduction of solar heat load entering a building or vehicle through its windows is important in minimizing air conditioning load and promoting personal comfort. Clear infrared rejecting films have been made using metalized or dyed polymer films and multilayer polymer stacks that reflect or absorb unwanted infrared radiation. Ideally, such films transmit all light in the wavelength region sensitive to the human eye, typically from about 380 to about 700 nanometers (nm), and reject solar radiation outside the visible portion of the spectrum. Metalized and dyed polymer films suffer from reduced performance when used for extended periods of time in window film applications, as they are susceptible to UV degradation and chemical assault from various sources. Their failure mechanism is typically non-uniform, creating poor visual appearance after prolonged exposure. Also, the reflectivity of metal layers originates from a thin coating and if this coating is damaged, the performance of the film is decreased. Clear infrared rejecting film can be made from a quarter wave mirror that has its reflecting band in the near infrared. Infrared rejecting films made from alternating layers of metal oxides have been described in U.S. Pat. No. 5,179,468, U.S. Pat. No. 4,705, 356 and EP 0 080 182. Films made from a combination of metal and metal oxide layers have been described in U.S. Pat. Nos. 4,389,452; 4,799,745; 5,071,206; and 5,306,547. Infrared rejecting films made from alternating layers of polymers with high and low indices of refraction have been described in U.S. Pat. Nos. RE 34,605; 5,233, 465; and 5,360,659; U.S. Ser. Nos. 08/402,041 entitled "Optical Film" and 08/67;2691 entitled "Transparent Multilayer Device; and U.S. Ser. No. 09/006,118 entitled "Multicomponent Optical Body", filed on even date under Attorney Docket No. 53543USA1A, in which a generalized scheme is described for controlling higher order reflections while maintaining desired relationships between the in-plane and out-of-plane indices of refraction so that the percent reflection of the first order harmonic remains essentially constant, or increases, as a function of incidence angle. These films are not susceptible to the same degradation mechanisms as thin metal or metal oxide layers or dyed films, as it is necessary to destroy the entire film to reduce performance. The films are highly corrosion resistant, have a neutral color, and can have various properties built into the film, such as antistatic, abrasion resistant, and slip layers incorporated in the film's surface. The flexibility and manufacturing cost of the films make them well suited for use as a laminate to glass before window construction as well as for retrofit applications.

For many applications, it is desirable that the infrared reflective film reflect as much solar radiation as possible in the infrared portion of the spectrum while maintaining essentially complete transparency in the visible region of the spectrum.

One problem with the quarter-wave polymeric films is that without proper compensation to eliminate overtones, higher order reflections will appear at fractions of the first order reflection and exhibit iridescence and visible color. Mathematically, higher order reflections will appear at $$\lambda_m = (2/M) \times D_r$$

Where M is the order of the reflection (for example, 2, 3, 4, etc.) and $D_r$ is the optical thickness of an optical repeating unit, of which multiple units are used to form the multilayer stack. Accordingly, $D_r$ is the sum of the optical thicknesses of the individual polymer layers that make up the optical repeating and the optical thickness is the product of $n_i$, the in plane refractive index of material i, and $d_i$, the actual thickness of material i. As can be seen, higher order reflections appear at fractions of the first order reflection. For example, a film designed to reflect infrared radiation between about 700 and 2000 nm will also reflect at 1000 nm, 667 nm, 500 nm, of which the latter two are in the visible range and would produce strong iridescent color. It is possible to suppress some higher order reflections by proper selection of the ratio of the optical thicknesses in two component multilayer films. See, Radford et al, "Reflectivity of Iridescent Coextruded Multilayered Plastic Films", Polymer Engineering and Science, vol. 13, No. 3, May 1973. This ratio of optical thicknesses is termed "f-ratio", for a two component film, where f=n1 d1/(n1 d1+n2 d2). Such two component films do not suppress successive second, third and fourth order visible wavelengths. Optical coatings comprising layers of three or more materials have been designed which are able to suppress certain higher order reflections. For example, U.S. Pat. No. 3,247,392 describes an optical coating used as a band pass filter reflecting in the infrared and ultraviolet regions of the spectrum. The coating is taught to suppress second and third order reflectance bands, but the materials used in the fabrication of the coating are metal oxide and metal halide dielectric materials which must be deposited in separate steps using expensive vacuum deposition techniques. Other vacuum deposition techniques used to reduce higher order reflections are taught in U.S. Pat. Nos. 3,432,225 and 4,229,066, and in "Design of Three-Layer Equivalent Films", Journal of the Optical Society of America, Vol. 68 (I), 137 (January 1978). U.S. Pat. No. RE 34,605 describes an all polymeric three-component optical interference film formed by coextrusion techniques which reflects infrared light while suppressing second, third and fourth order reflections in the visible region of the spectrum. The polymers in the film are required to have closely defined refractive indexes, which limits the choice of polymers which may be used, and production of the film requires separate extruders for each of the three polymeric components. U.S. Pat. No. 5,360,659 describes an all polymeric two-component film which can also be coextruded and reflects infrared light while suppressing second, third, and fourth order wavelengths which occur in the visible portion of the spectrum. The film comprises alternating layers of first (A) and second (B) diverse polymeric materials having a six layer alternating repeat unit with relative optical thicknesses of about 7:1:1:7:1:1 for the layers of A:B:A:B:A:B, respectively. In an alternative embodiment of the invention the two-component film comprises a first portion of alternating layers comprising the six layer alternating layer repeating unit with relative optical thicknesses of about 7:1:1:7:1:1 for the layers of A:B:A:B:A:B, respectively, and a second portion of alternating layers having a repeating unit AB of equal optical thicknesses.

A second problem with the quarter-wave polymeric films, or any dielectric reflectors, is that the reflection band shifts in wavelength with observed incident angle. When this happens, there is a dramatic color change at high angles of incidence, with cyan color observed in reflection and deep red observed in transmission. The shift in the reflection band is caused by the change in effective index of refraction with angle. Both the band centers and the width of the reflection band change as the incidence angle changes, with the reflecting band always shifting towards shorter wavelengths. This is counterintuitive, as the total path length increases with angle. The band position does not depend on the total path length, but the difference in path length between reflections off the interfaces, and this difference decreases with angle. The high wavelength bandedge also shifts differently from the low wavelength bandedge. For low wavelength bandedges, the change in center and width with angle tend to cancel. For the high wavelength bandedge, the changes add to broaden the band. Typically, for the materials under consideration, a bandedge shifts to about 80% of its normal incidence wavelength when viewed at grazing incidence. For the present applications, in order to not have visible color when the film is viewed at non-normal angles, it is necessary that the low wavelength bandedge of an infrared reflector be positioned sufficiently far into the infrared so that it is not observed at a desired use angle. Typically, the film must be designed so that the short wavelength edge of the normal angle is shifted 100–150 nm away from the edge of the visible spectrum. For example, for a multilayer infrared reflecting film having alternating layers of PEN and PMMA, the short wavelength bandedge must be moved to about 850 nm to eliminate any perceived color with angle. This creates a gap between the edge of the visible spectrum (about 700 nm) and the low wavelength bandedge of about 150 nm.

For many applications it is desirable to reflect as much of the solar spectrum as possible which contributes to heat load, while transmitting all of the visible spectrum. Shifting the bandedge to longer wavelengths for the normal incidence condition results in a gap between the reflectance band and the visible edge of the spectrum, resulting in lower spectral coverage at wavelengths where the solar infrared spectrum is a maximum. This correlates to an over-all increase in the shading coefficient of the film, which is a measure of the amount of solar energy that enters the window compared to that of a simple pane of glass. Accordingly, the need exists for an infrared film that reflects the maximum amount of solar infrared even when the reflecting band is shifted to compensate for visible color when the film is viewed at non-normal angles. It is further needed that such a film be able to eliminate higher order reflections that also contribute to visible color and iridescence.

U.S. Pat. No. 5,486,949 discloses that it may be desirable to incorporate coloring agents such as dyes or pigments into one or more layers of a birefringent polarizer to permit selective absorption of certain wavelengths of light and control the bandwidth of reflected polarized light and the wavelength range of transmitted light. U.S. Pat. No. 4,705,356 discloses a thin film optically variable article having substantial color shift with varying angle of light incidence and viewing comprising an optically thick substantially transparent structural element carrying a colorant and a multilayer interference coating, whereby the colorant serves to modify in essentially a substractive mode the color at normal incidence and the color shift with angle of the multilayer interference coating as seen by transmission of light through the article. Neither U.S. Pat. No. 5,486,949 nor U.S. Pat. No. 4,705,356 disclose an optical body comprising a film having a reflecting band positioned to reflect infrared radiation of at least one polarization at an incident angle normal to the film combined with a component designed to at least partially absorb or reflect infrared radiation at normal incidence in the region resulting from the positioned reflecting band.

SUMMARY OF THE INVENTION

The present invention relates to an optical body comprising (a) a birefringent dielectric multilayer film, which may be a polarizer, mirror, or both, having a reflecting band positioned to reflect infrared radiation of at least one polarization at an incident angle normal to the film, said reflecting band having a short wavelength bandedge $\lambda_{a0}$ and long wavelength bandedge $\lambda_{B0}$ at a normal incident angle, and a short wavelength bandedge $\lambda_{a\theta}$ and long wavelength bandedge; at a maximum usage angle $\theta$, wherein $\lambda_{a\theta}$ is less than $\lambda_{a0}$ and $\lambda_{a0}$ is selectively positioned at a wavelength greater than about 700 nm; and (b) at least one component which at least partially absorbs or reflects radiation in the wavelength region between, $\lambda_{a\theta}$ and $\lambda_{a0}$ at a normal angle of incidence.

The present invention also relates to an optical body comprising (a) an isotropic dielectric multilayer film having a reflecting band positioned to reflect infrared radiation of at least one polarization at an incident angle normal to the film, said reflecting band having a short wavelength bandedge $\lambda_{a0}$ and long wavelength bandedge $\lambda_{b0}$ at a normal incident angle, and a short wavelength bandedge $\lambda_{a\theta}$ and long wavelength bandedge $\lambda_{b\theta}$ at a maximum usage angle $\theta$, wherein $\lambda_{a\theta}$ is less than $\lambda_{a0}$ to and $\lambda_{a0}$ is selectively positioned at a wavelength greater than about 700 nm; and (b) at least one component which at least partially absorbs or reflects radiation in the wavelength region between $\lambda_{a\theta}$ and $\lambda_{a0}$ at a normal angle of incidence.

The optical body of the present invention provides good reflectivity in the infrared region of the spectrum and improved shading coefficient at normal angles while still transmitting visible light at all desirable angles of incidence.

BRIEF DESCRIPTION OF THE DRAWINGS

The invention will be further explained with reference to the drawings, in which like numbers designate like structures throughout the various Figures, and in which.

DETAILED DESCRIPTION OF THE INVENTION

Figure 1:
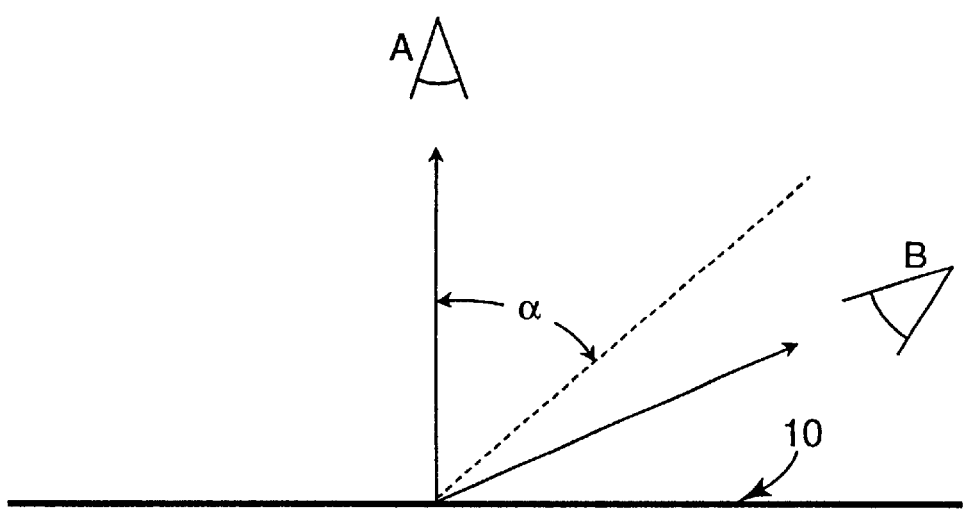
FIG. 1 is a schematic illustration of the effect of a multilayer film of the present invention when viewed by an observer at two points relative to the film.

The infrared film of the present invention can be designed so that the short wavelength edge of the normal angle spectrum is a certain wavelength, depending on the requirements of the end application, away from the edge of the visible, for example, 100–150 nm away. This allows the film to be designed to avoid off-angle color changes, for example, the film may be designed so that the off angle shift does not allow the low wavelength bandedge to encroach into the visible and cause color or, when there is already visible color at normal angles, the film can be designed so that the off angle color shift does not cause perceptible color change in the film. Shifting the bandedge to longer wavelengths for the normal incidence condition results in lower spectral coverage at wavelengths where the solar infrared spectrum is a maximum. In the present invention, a wavelength gap filler component is used to cover at least a part of the gap between, for example, the short wavelength reflecting bandedge and the edge of the visible spectrum.

Film

The film of the present invention comprises at least two layers and is a dielectric optical film having alternating layers of a material having a high index of refraction and a material having a low index of refraction. The film may be isotropic or birefringent. Preferably, the film is a birefringent polymeric film, and more preferably the film is designed to allow the construction of multilayer stacks for which the Brewster angle (the angle at which reflectance of p polarized light goes to zero) is very large or is nonexistent for the polymer layer interfaces. This feature allows for the construction of multilayer mirrors and polarizers whose reflectivity for p polarized light decreases slowly with angle of incidence, is independent of angle of incidence, or increases with angle of incidence away from the normal. As a result, the multilayered films of the present invention have high reflectivity (for both s and p polarized light for any incident direction in the case of mirrors, and for the selected direction in the case of polarizers) over a wide bandwidth. The film of this invention can be used to prepare multilayer films having an average reflectivity of at least 50% over at least a 100 nm wide band in the infrared region of the spectrum. filed Suitable films include those described in U.S. Ser. No. 08/402,401 filed Mar. 10, 1995, and U.S. Ser. No. 09/066, 601, entitled "Modified Copolyesters and Improved Multilayer Reflective Film" filed on even date under Attorney Docket No. 53550USA6A", both of which are hereby incorporated by reference.

Suitable films also include those which prevent higher order harmonics which prevent color in the visible region of the spectrum. Examples of such film include those described in U.S. Pat. No. RE 3,034,605, incorporated herein by reference, which describes a multilayer optical interference film comprising three diverse substantially transparent polymeric materials, A, B, and C and having a repeating unit of ABCB. The layers have an optical thickness of between about 0.09 and 0.45 micrometers, and each of the polymeric materials has a different index of refraction, ni. The film includes polymeric layers of polymers A, B, and C. Each of the polymeric materials have its own different refractive index, $n_A$, $n_B$, $n_C$, respectively. A preferred relationship of the optical thickness ratios of the polymers produces an optical interference film in which multiple successive higher order reflections are suppressed. In this embodiment, the optical thickness ratio of first material A, $f_A$, is ⅕, the optical thickness ratio of second material B, $f_B$, is ⅙, the optical thickness of third material C, $f_c$ is ⅓, and $n_B=\sqrt{n_A n_C}$.

For this embodiment, there will be an intense reflection at the first order wavelength, while the reflections at the second, third, and fourth order wavelengths will be suppressed. To produce a film which reflects a broad bandwidth of wavelengths in the solar infrared range (e.g., reflection at from about 0.7 to 2.0 micrometers), a layer thickness gradient may be introduced across the thickness of the film. Thus, the layer thicknesses may increase monotonically across the thickness of the film. Preferably, for the preferred three component system of the present invention, the first polymeric material (A) differs in refractive index from the second polymeric material (B) by at least about 0.03, the second polymeric material (B) differs in refractive index from the third polymeric material (C) by at least about 0.03, and the refractive index of the second polymeric material (B) is intermediate the respective refractive indices of the first (A) and third (C) polymeric materials. Any or all of the polymeric materials may be synthesized to have the desired index of refraction by utilizing a copolymer or miscible blend of polymers. For example, the second polymeric material may be a copolymer or miscible blend of the first and third polymeric materials. By varying the relative amounts of monomers in the copolymer or polymers in the blend, any of the first, second, or third materials can be adjusted so that there is a refractive index relationship where $n_B=\sqrt{n_A n_C}$.

Another suitable film includes the film described in U.S. Pat. No. 5,360,659, incorporated herein by reference, which describes a two component film having a six layer alternating repeating unit suppresses the unwanted second, third, and fourth order reflections in the visible wavelength region of between about 380–770 nm while reflecting light in the infrared wavelength region of between about 770–2000 nm. Reflections higher than fourth order will generally be in the ultraviolet, not visible, region of the spectrum or will be of such a low intensity as to be unobjectionable. The film comprises alternating layers of first (A) and second (B) diverse polymeric materials in which the six layer alternating repeat unit has relative optical thicknesses of about .778A.111B.111A.778B.111A.111. The use of only six layers in the repeat unit results in more efficient use of material and simpler manufacture than previous designs. A repeat unit gradient may be introduced across the thickness of the film. Thus, in one embodiment, the repeat unit thicknesses will increase linearly across the thickness of the film. By linearly, it is meant that the repeat unit thicknesses increase at a constant rate across the thickness of the film. In some embodiments, it may be desirable to force the repeat unit optical thickness to double from one surface of the film to another. The ratio of repeat unit optical thicknesses can be greater or less than two as long as the short wavelength range of the reflectance band is above 770 nm and the long wavelength edge is about 2000 nm. Other repeat unit gradients may be introduced by using logarithmic and/or quartic functions. A logarithmic distribution of repeat unit thicknesses will provide nearly constant reflectance across the infrared band. In an alternative embodiment, the two component film may comprise a first portion of alternating layers comprising the six layer alternating layer repeating unit which reflects infrared light of wave lengths between about 1200–2000 nm and a second portion of alternating layers having an AB repeat unit and substantially equal optical thicknesses which reflect infrared light of wavelengths between about 770–1200 nm. Such a combination of alternating layers results in reflection of light across the infrared wavelength region through 2000 nm. Preferably, the first portion of the alternating layers has a repeat unit gradient of about 5/3:1, and the second portion of alternating layers have a layer thickness gradient of about 1.5:1.

In an alternate embodiment, the infrared reflecting film of the present invention may comprise a first portion of alternating layers comprising a six layer alternating layer repeating unit or a multicomponent optical design that reflects infrared light of wavelengths between about 1200–2000 nm while minimizing higher order reflections that contribute to visible color, and a second portion of alternating layers having an AB repeat unit and substantially equal optical thicknesses which reflect infrared light of wavelengths between about 700–1200 nm. Such a combination of alternating layers results in reflection of light across the infrared wavelength region through about 2000 nm, and is commonly known as a "hybrid design". This hybrid design may be provided as described, for example, in U.S. Pat. No. 5,360,659, but has broader application in that it is useful with any of the multicomponent optical designs described herein. The layer thicknesses of both portions of alternating layers can then be adjusted to place the reflecting band within the infrared spectrum so as to minimize any perceived color change with angle.

Another useful film design is described in U.S. Ser. No. 09/066118 entitled "Multicomponent Optical Body" filed on even date under Attorney Docket No. 53543USA1A, which is incorporated herein by reference. Optical films and other optical bodies are described which exhibit a first order reflection band for at least one polarization of electromagnetic radiation in a first region of the spectrum while suppressing at least the second, and preferably also at least the third, higher order harmonics of the first reflection band, while the % reflection of the first order harmonic remains essentially constant, or increases, as a function of angle of incidence. This is accomplished by forming at least a portion of the optical body out of polymeric materials A, B, and C which are arranged in a repeating sequence ABC, wherein A has refractive indices $n_x^A$, $n_y^A$, and $n_z^A$ along mutually orthogonal axes x, y, and z, respectively, B has refractive indices $n_x^B$, $n_y^B$, and $n_z^B$ along axes x, y and z, respectively, and C has refractive indices $n_x^C$, $n_y^C$ and $n_z^C$ along axes x, y, and z, respectively, where axis z is orthogonal to the plane of the film or optical body, wherein $n_x^A > n_x^B > n_x^C$ or $n_y^A > n_y^B > n_y^C$, and wherein $n_z^C \geq n_z^B \geq n_z^A$. Preferably, at least one of the differences $n_z^A - n_z$ and $n_z^B - n_z^C$ is less than or equal to about −0.05.

By designing the film or optical body within these constraints, at least some combination of second, third and forth higher-order reflections can be suppressed without a substantial decrease of the first harmonic reflection with angle of incidence, particularly when the first reflection band is in the infrared region of the spectrum. Such films and optical bodies are particularly useful as IR mirrors, and may be used advantageously as window films and in similar applications where IR protection is desired but good transparency and low color are important.

Materials Selection and Processing

While the optical film of the present invention can be made with dielectric inorganic thin film stacks of materials such as indium tin oxide (ITO), silicon dioxide (SiO2), zirconium dioxide (ZrO2), or titanium dioxide (TiO2) as described, for example, in EP 0 080 182 and U.S. Pat. Nos. 4,705,356 and 5,179,468, the preferred optical film is a polymeric multilayer film having alternating layers of polymeric materials having high and low indices of refraction. The construction, materials, and optical properties of conventional multilayer polymeric films are generally known, and were first described in Alfrey et al., *Polymer Engineering and Science*, Vol. 9, No. 6, pp 400–404, November 1969; Radford et al., *Polymer Engineering and Science*, Vol. 13, No. 3, pp 216–221, May 1973; and U.S. Pat. No. 3,610,729 (Rogers). More recently patents and publications including PCT International Publication Number WO 95/17303 (Ouderkirk et al.), PCT International Publication Number WO 96/19347 (Jonza et al.), U.S. Pat. No. 5,095,210 (Wheatley et al.), and U.S. Pat. No. 5,149,578 (Wheatley et al.), discuss useful optical effects which can be achieved with large numbers of alternating thin layers of different polymeric materials that exhibit differing optical properties, in particular different refractive indices in different directions. The contents of all of these references are incorporated by reference herein.

Multilayer polymeric films can include hundreds or thousands of thin layers, and may contain as many materials as there are layers in the stack. For ease of manufacturing, preferred multilayer films have only a few different materials, and for simplicity those discussed herein typically include only two. The multilayer film includes alternating layers of a first polymeric material having a first index of refraction, and a second polymeric material having a second index of refraction that is different from that of the first material. The individual layers are typically on the order of 0.05 micrometers to 0.45 micrometers thick. As an example, the PCT Publication to Ouderkirk et al. discloses a multi-layered polymeric film having alternating layers of crystalline naphthalene dicarboxylic acid polyester and another selected polymer, such as copolyester or copolycarbonate, wherein the layers have a thickness of less than 0.5 micrometers, and wherein the refractive indices of one of the polymers can be as high as 1.9 in one direction and 1.64 in the other direction, thereby providing a birefringent effect which is usefull in the polarization of light.

Figure 2:
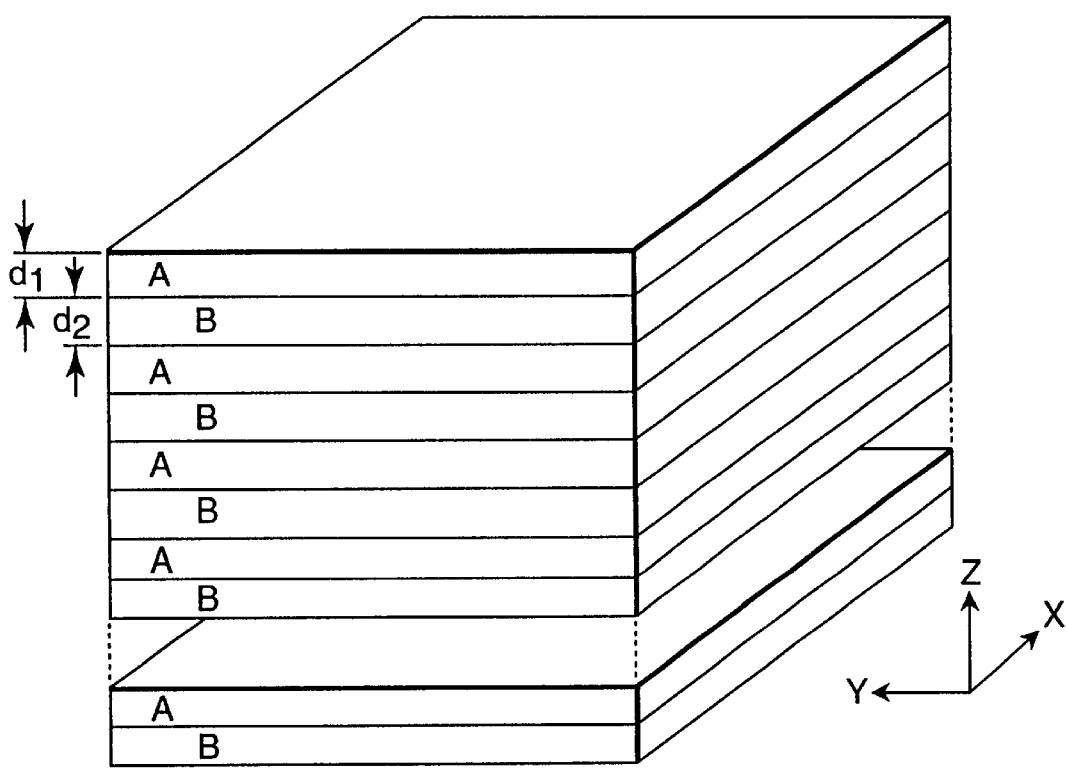
FIG. 2 is a perspective view of a multilayer film useful in the optical body of the present invention.

Adjacent pairs of layers (one having a high index of refraction, and the other a low index) preferably have a total optical thickness that is ½ of the wavelength of the light desired to be reflected, as shown in FIG. 2. For maximum reflectivity the individual layers of a multilayer polymeric film have an optical thickness that is ¼ of the wavelength of the light desired to be reflected, although other ratios of the optical thicknesses within the layer pairs may be chosen for other reasons. These preferred conditions are expressed in Equations 1 and 2, respectively. Note that optical thickness is defined as the refractive index of a material multiplied by the actual thickness of the material, and that unless stated otherwise, all actual thicknesses discussed herein are measured after any orientation or other processing. For biaxially oriented multilayer optical stacks at normal incidence, the following equation applies:

$$\lambda/2 = t_1 + t_2 = n_1 d_1 + n_2 d_2 \qquad \text{Equation 1}$$

$$\lambda/4 = t_1 = t_2 = n_1 d_1 = n_2 d_2 \qquad \text{Equation 2}$$

where $\lambda$=wavelength of maximum light reflection
$t_1$=optical thickness of the first layer of material
$t_2$=optical thickness of the second layer of material and
$n_1$=in-plane refractive index of the first material
$n_2$=in-plane refractive index of the second material
$d_1$=actual thickness of the first material
$d_2$=actual thickness of the second material By creating a multilayer film with layers having different optical thicknesses (for example, in a film having a layer thickness gradient), the film will reflect light of different wavelengths. An important feature of the present invention is the selection of layers having desired optical thicknesses (by selecting the actual layer thicknesses and materials) sufficient to reflect light in the near infrared portion of the spectrum. Moreover, because pairs of layers will reflect a predictable band width of light, as described below, individual layer pairs may be designed and made to reflect a given band width of light. Thus, if a large number of properly selected layer pairs are combined, superior reflectance of a desired portion of the near infrared spectrum can be achieved.

The bandwidth of light desired to be blocked, i.e., not transmitted, at a zero degree observation angle in accordance with an optical body of the present invention is from approximately 700 to 1200 nm. Thus, the layer pairs preferably have optical thicknesses ranging from 350 to 600 nm (½ the wavelength of the light desired to be reflected) in order to reflect the near infrared light. More preferably, the multilayer film would have individual layers each having an optical thickness ranging from 175 to 300 nm (¼ the wavelength of the light desired to be reflected), in order to reflect the near infrared light. Assuming for purposes of illustration that the first layer material has a refractive index of 1.66 (as does biaxially oriented PET), and the second layer material has a refractive index of 1.52 (as does the biaxially oriented thermoplastic polyester commercially available from Eastman Chemical Co., Knoxville, Tenn., under the trade designation "Ecdel"), and assuming that both layers have the same optical thickness (¼ wavelength), then the actual thicknesses of the first material layers would range from approximately 105 to 180 nm, and the actual thicknesses of the second layers would range from approximately 115 to 197 nm. The optical properties of multilayer films such as this are discussed in detail below.

The various layers in the film preferably have different thicknesses. This is commonly referred to as the layer thickness gradient. A layer thickness gradient is selected to achieve the desired band width of reflection. One common layer thickness gradient is a linear one, in which the thickness of the thickest layer pairs is a certain percent thicker than the thickness of the thinnest layer pairs. For example, a 1.055:1 layer thickness gradient means that the thickest layer pair (adjacent to one major surface) is 5.5% thicker than the thinnest layer pair (adjacent to the opposite surface of the film). In another embodiment, the layer thickness could decrease, then increase, then decrease again from one major surface of the film to the other. This is believed to provide sharper bandedges, and thus a sharper or more abrupt transition from clear to colored in the case of the present invention. This preferred method for achieving sharpened bandedges is described more fully in U.S. Ser. No. 09/006085 entitled "Optical Film with Sharpened Bandedge" filed on even date under Attorney Docket No. 53545USA7A.

Many different materials may be used in the dielectric color shifting films of the present invention, depending on the specific application to which the film is directed. Such materials include inorganic materials such as $SiO_2$, $TiO_2$, $ZrO_2$, or ITO, or organic materials such as liquid crystals, and polymeric materials, including monomers, copolymers, grafted polymers, and mixtures or blends thereof. The exact choice of materials for a given application will be driven by the desired match and mismatch obtainable in the refractive indices between the various optical layers along a particular axis, as well as the desired physical properties in the resulting product.

Suitable polymeric materials for use in the optical films of the present invention may be amorphous, semicrystalline, or crystalline polymeric materials. The films consist of at least two distinguishable polymers having different indices of refraction. The number is not limited, and three or more materials may be advantageously used in applications wherein it is desirable to eliminate higher order harmonics that would otherwise reflect light in the visible region of the spectrum and give a film with a colored appearance. For simplicity, the films will be described further considering an optical stack made from only two materials.

A variety of polymer materials suitable for use in the present invention have been taught for use in making coextruded multilayer optical films. For example, in U.S. Pat. Nos. 4,937,134, 5,103,337, 5,1225,448,404, 5,540,978, and 5,568,316 to Schrenk et al., and in 5,122,905, 5,122,906, and 5,126,880 to Wheatley and Schrenk. Of special interest are birefringent polymers such as those described in 5,486,949 and 5,612,820 to Schrenk et al, U.S. Application No. 08/402,041 to Jonza et al, and U.S. Ser. No. 09/006601 entitled "Modified Copolyesters and Improved Multilayer Reflective Films" filed on even date under Attorney Docket No. 53550USA6A, all of which are herein incorporated by reference. Regarding the preferred materials from which the films are to be made, there are several conditions which should be met to make the multilayer optical films of this invention. First, these films should consist of at least two distinguishable polymers; the number is not limited, and three or more polymers may be advantageously used in particular films. Second, at least one of the two required polymers, referred to as the "first polymer", should have a stress optical coefficient having a large absolute value. In other words, it must be capable of developing a large birefringence when stretched. Depending on the application, the birefringence may be developed between two orthogonal directions in the plane of the film, between one or more in-plane directions and the direction perpendicular to the film plane, or a combination of these. Third, the first polymer should be capable of maintaining birefringence after stretching, so that the desired optical properties are imparted to the finished film. Fourth, the other required polymer, referred to as the "second polymer", should be chosen so that in the finished film, its refractive index, in at least one direction, differs significantly from the index of refraction of the first polymer in the same direction. Because polymeric materials are typically dispersive, that is, the refractive indices vary with wavelength, these conditions must be considered in terms of a particular spectral bandwidth of interest.

Other aspects of polymer selection depend on specific applications. For polarizing films, it is advantageous for the difference in the index of refraction of the first and second polymers in one film-plane direction to differ significantly in the finished film, while the difference in the orthogonal film-plane index is minimized. If the first polymer has a large refractive index when isotropic, and is positively birefringent (that is, its refractive index increases in the direction of stretching), the second polymer will be chosen to have a matching refractive index, after processing, in the planar direction orthogonal to the stretching direction, and a refractive index in the direction of stretching which is as low as possible. Conversely, if the first polymer has a small refractive index when isotropic, and is negatively birefringent, the second polymer will be chosen to have a matching refractive index, after processing, in the planar direction orthogonal to the stretching direction, and a refractive index in the direction of stretching which is as high as possible.

Alternatively, it is possible to select a first polymer which is positively birefringent and has an intermediate or low refractive index when isotropic, or one which is negatively birefringent and has an intermediate or high refractive index when isotropic. In these cases, the second polymer may be chosen so that, after processing, its refractive index will match that of the first polymer in either the stretching direction or the planar direction orthogonal to stretching. Further, the second polymer will be chosen such that the difference in index of refraction in the remaining planar direction is maximized, regardless of whether this is best accomplished by a very low or very high index of refraction in that direction.

One means of achieving this combination of planar index matching in one direction and mismatching in the orthogonal direction is to select a first polymer which develops significant birefringence when stretched, and a second polymer which develops little or no birefringence when stretched, and to stretch the resulting film in only one planar direction. Alternatively, the second polymer may be selected from among those which develop birefringence in the sense opposite to that of the first polymer (negative—positive or positive—negative). Another alternative method is to select both first and second polymers which are capable of developing birefringence when stretched, but to stretch in two orthogonal planar directions, selecting process conditions, such as temperatures, stretch rates, post-stretch relaxation, and the like, which result in development of unequal levels of orientation in the two stretching directions for the first polymer, and levels of orientation for the second polymer such that one in-plane index is approximately matched to that of the first polymer, and the orthogonal in-plane index is significantly mismatched to that of the first polymer. For example, conditions may be chosen such that the first polymer has a biaxially oriented character in the finished film, while the second polymer has a predominantly uniaxially oriented character in the finished film.

The foregoing is meant to be exemplary, and it will be understood that combinations of these and other techniques may be employed to achieve the polarizing film goal of index mismatch in one in-plane direction and relative index matching in the orthogonal planar direction.

Different considerations apply to a reflective, or mirror, film. Provided that the film is not meant to have some polarizing properties as well, refractive index criteria apply equally to any direction in the film plane, so it is typical for the indices for any given layer in orthogonal in-plane directions to be equal or nearly so. It is advantageous, however, for the film-plane indices of the first polymer to differ as greatly as possible from the film-plane indices of the second polymer. For this reason, if the first polymer has a high index of refraction when isotropic, it is advantageous that it also be positively birefringent. Likewise, if the first polymer has a low index of refraction when isotropic, it is advantageous that it also be negatively birefringent. The second polymer advantageously develops little or no birefringence when stretched, or develops birefringence of the opposite sense (positive—negative or negative—positive), such that its film-plane refractive indices differ as much as possible from those of the first polymer in the finished film. These criteria may be combined appropriately with those listed above for polarizing films if a mirror film is meant to have some degree of polarizing properties as well.

Colored films can be regarded as special cases of mirror and polarizing films. Thus, the same criteria outlined above apply. The perceived color is a result of reflection or polarization over one or more specific bandwidths of the spectrum. The bandwidths over which a multilayer film of the current invention is effective will be determined primarily by the distribution of layer thicknesses employed in the optical stack(s), but consideration must also be given to the wavelength dependence, or dispersion, of the refractive indices of the first and second polymers. It will be understood that the same rules apply to the infrared and ultraviolet wavelengths as to the visible colors.

Absorbance is another consideration. For most applications, it is advantageous for neither the first polymer nor the second polymer to have any absorbance bands within the bandwidth of interest for the film in question. Thus, all incident light within the bandwidth is either reflected or transmitted. However, for some applications, it may be useful for one or both of the first and second polymer to absorb specific wavelengths, either totally or in part.

Polyethylene 2,6-naphthalate (PEN) is frequently chosen as a first polymer for films of the present invention. It has a large positive stress optical coefficient, retains birefringence effectively after stretching, and has little or no absorbance within the visible range. It also has a large index of refraction in the isotropic state. Its refractive index for polarized incident light of 550 nm wavelength increases when the plane of polarization is parallel to the stretch direction from about 1.64 to as high as about 1.9. Its birefringence can be increased by increasing its molecular orientation which, in turn, may be increased by stretching to greater stretch ratios with other stretching conditions held fixed.

Other semicrystalline naphthalene dicarboxylic polyesters are also suitable as first polymers. Polybutylene 2,6-Naphthalate (PBN) is an example. These polymers may be homopolymers or copolymers, provided that the use of comonomers does not substantially impair the stress optical coefficient or retention of birefringence after stretching. The term "PEN" herein will be understood to include copolymers of PEN meeting these restrictions. In practice, these restrictions imposes an upper limit on the comonomer content, the exact value of which will vary with the choice of comonomer(s) employed. Some compromise in these properties may be accepted, however, if comonomer incorporation results in improvement of other properties. Such properties include but are not limited to improved interlayer adhesion, lower melting point (resulting in lower extrusion temperature), better rheological matching to other polymers in the film, and advantageous shifts in the process window for stretching due to change in the glass transition temperature.

Suitable comonomers for use in PEN, PBN or the like may be of the diol or dicarboxylic acid or ester type. Dicarboxylic acid comonomers include but are not limited to terephthalic acid, isophthalic acid, phthalic acid, all isomeric naphthalenedicarboxylic acids (2,6-, 1,2-, 1,3-, 1,4-, 1,5-, 1,6-, 1,7-, 1,8-, 2,3-, 2,4-, 2,5-, 2,7-, and 2,8-), bibenzoic acids such as 4,4'-biphenyl dicarboxylic acid and its isomers, trans4,4'-stilbene dicarboxylic acid and its isomers, 4,4'-diphenyl ether dicarboxylic acid and its isomers, 4,4'-diphenylsulfone dicarboxylic acid and its isomers, 4,4'-benzophenone dicarboxylic acid and its isomers, halogenated aromatic dicarboxylic acids such as 2-chloroterephthalic acid and 2,5-dichloroterephthalic acid, other substituted aromatic dicarboxylic acids such as tertiary butyl isophthalic acid and sodium sulfonated isophthalic acid, cycloalkane dicarboxylic acids such as 1,4-cyclohexanedicarboxylic acid and its isomers and 2,6-decahydronaphthaletic dicarboxylic acid and its isomers, bi- or multi-cyclic dicarboxylic acids (such as the various isomeric norbomane and norbornene dicarboxylic acids, adamantane dicarboxylic acids, and bicyclo-octane dicarboxylic acids), alkane dicarboxylic acids (such as sebacic acid, adipic acid, oxalic acid, malonic acid, succinic acid, glutaric acid, azelaic acid, and dodecane dicarboxylic acid.), and any of the isomeric dicarboxylic acids of the fused-ring aromatic hydrocarbons (such as indene, anthracene, pheneanthrene, benzonaphthene, fluorene and the like). Alternatively, alkyl esters of these monomers, such as dimethyl terephthalate, may be used.

Suitable diol comonomers include but are not limited to linear or branched alkane diols or glycols (such as ethylene glycol, propanediols such as trimethylene glycol, butanediols such as tetramethylene glycol, pentanediols such as neopentyl glycol, hexanediols, 2,2,4-trimethyl-1,3-pentanediol and higher diols), ether glycols (such as diethylene glycol, triethylene glycol, and polyethylene glycol), chain-ester diols such as 3-hydroxy-2,2-dimethylpropyl-3-hydroxy-2,2-dimethyl propanoate, cycloalkane glycols such as 1,4-cyclohexanedimethanol and its isomers and 1,4-cyclohexanediol and its isomers, bi- or multicyclic diols (such as the various isomeric tricyclodecane dimethanols, norbornane dimethanols, norbornene dimethanols, and bicyclo-octane dimethanols), aromatic glycols (such as 1,4-benzenedimethanol and its isomers, 1,4-benzenediol and its isomers, bisphenols such as bisphenol A, 2,2'-dihydroxy biphenyl and its isomers, 4,4'-dihydroxymethyl biphenyl and its isomers, and 1,3-bis(2-hydroxyethoxy)benzene and its isomers), and lower alkyl ethers or diethers of these diols, such as dimethyl or diethyl diols.

Tri- or polyfunctional comonomers, which can serve to impart a branched structure to the polyester molecules, can also be used. They may be of either the carboxylic acid, ester, hydroxy or ether types. Examples include, but are not limited to, trimellitic acid and its esters, trimethylol propane, and pentaerythritol.

Also suitable as comonomers are monomers of mixed functionality, including hydroxycarboxylic acids such as parahydroxybenzoic acid and 6-hydroxy-2-naphthalenecarboxylic acid, and their isomers, and tri- or polyfunctional comonomers of mixed functionality such as 5-hydroxyisophthalic acid and the like.

Polyethylene terephthalate (PET) is another material that exhibits a significant positive stress optical coefficient, retains birefringence effectively after stretching, and has little or no absorbance within the visible range. Thus, it and its high PET-content copolymers employing comonomers listed above may also be used as first polymers in some applications of the current invention.

When a naphthalene dicarboxylic polyester such as PEN or PBN is chosen as first polymer, there are several approaches which may be taken to the selection of a second polymer. One preferred approach for some applications is to select a naphthalene dicarboxylic copolyester (coPEN) formulated so as to develop significantly less or no birefringence when stretched. This can be accomplished by choosing comonomers and their concentrations in the copolymer such that crystallizability of the coPEN is eliminated or greatly reduced. One typical formulation employs as the dicarboxylic acid or ester components dimethyl naphthalate at from about 20 mole percent to about 80 mole percent and dimethyl terephthalate or dimethyl isophthalate at from about 20 mole percent to about 80 mole percent, and employs ethylene glycol as diol component. Of course, the corresponding dicarboxylic acids may be used instead of the esters. The number of comonomers which can be employed in the formulation of a coPEN second polymer is not limited. Suitable comonomers for a coPEN second polymer include but are not limited to all of the comonomers listed above as suitable PEN comonomers, including the acid, ester, hydroxy, ether, tri- or polyfunctional, and mixed functionality types.

Often it is useful to predict the isotropic refractive index of a coPEN second polymer. A volume average of the refractive indices of the monomers to be employed has been found to be a suitable guide. Similar techniques well-known in the art can be used to estimate glass transition temperatures for coPEN second polymers from the glass transitions of the homopolymers of the monomers to be employed.

In addition, polycarbonates having a glass transition temperature compatible with that of PEN and having a refractive index similar to the isotropic refractive index of PEN are also useful as second polymers. Polyesters, copolyesters, polycarbonates, and copolycarbonates may also be fed together to an extruder and transesterified into new suitable copolymeric second polymers.

It is not required that the second polymer be a copolyester or copolycarbonate. Vinyl polymers and copolymers made from monomers such as vinyl naphthalenes, styrenes, ethylene, maleic anhydride, acrylajes, acetates, and methacrylates may be employed. Condensation polymers other than polyesters and polycarbonates may also be used. Examples include: polysulfones, polyamides, polyurethanes, polyamic acids, and polyimides. Naphthalene groups and halogens such as chlorine, bromine and iodine are useful for increasing the refractive index of the second polymer to a desired level. Acrylate groups and fluorine are particularly useful in decreasing refractive index when this is desired.

It will be understood from the foregoing discussion that the choice of a second polymer is dependent not only on the intended application of the multilayer optical film in question, but also on the choice made for the first polymer, and the processing conditions employed in stretching. Suitable second polymer materials include but are not limited to polyethylene naphthalate (PEN) and isomers thereof (such as 2,6-, 1,4-, 1,5-, 2,7-, and 2,3-PEN), polyalkylene terephthalates (such as polyethylene terephthalate, polybutylene terephthalate, and poly-1,4-cyclohexanedimethylene terephthalate), other polyesters, polycarbonates, polyarylates, polyamides (such as nylon 6, nylon 11, nylon 12, nylon 4/6, nylon 6/6, nylon 6/9, nylon 6/10, nylon 6/12, and nylon 6/T), polyimides (including thermoplastic polyimides and polyacrylic imides), polyamide-imides, polyether-amides, polyetherimides, polyaryl ethers (such as polyphenylene ether and the ring-substituted polyphenylene oxides), polyarylether ketones such as polyetheretherketone ("PEEK"), aliphatic polyketones (such as copolymers and terpolymers of ethylene and/or propylene with carbon dioxide), polyphenylene sulfide, polysulfones (including polyethersulfones and polyaryl sulfones), atactic polystyrene, syndiotactic polystyrene ("sPS") and its derivatives (such as syndiotactic poly-alpha-methyl styrene and syndiotactic polydichlorostyrene), blends of any of these polystyrenes (with each other or with other polymers, such as polyphenylene oxides), copolymers of any of these polystyrenes (such as styrene-butadiene copolymers, styrene-acrylonitrile copolymers, and acrylonitrile-butadiene-styrene terpolymers), polyacrylates (such as polymethyl acrylate, polyethyl acrylate, and polybutyl acrylate), polymethacrylates (such as polymethyl methacrylate, polyethyl methacrylate, polypropyl methacrylate, and polyisobutyl methacrylate), cellulose derivatives (such as ethyl cellulose, cellulose acetate, cellulose propionate, cellulose acetate butyrate, and cellulose nitrate), polyalkylene polymers (such as polyethylene, polypropylene, polybutylene, polyisobutylene, and poly(4-methyl)pentene), fluorinated polymers and copolymers (such as polytetrafluoroethylene, polytrifluoroethylene, polyvinylidene fluoride, polyvinyl fluoride, fluorinated ethylene-propylene copolymers, perfluoroalkoxy resins, polychlorotrifluoroethylene, polyethylene-co-trifluoroethylene, polyethylene-co-chlorotrifluoroethylene), chlorinated polymers (such as polyvinylidene; chloride and polyvinyl chloride), polyacrylonitrile, polyvinylacetate, polyethers (such as polyoxymethylene and polyethylene oxide), ionomeric resins, elastomers (such as polybutadiene, polyisoprene, and neoprene), silicone resins, epoxy resins, and polyurethanes.

Also suitable are copolymers, such as the copolymers of PEN discussed above as well as any other non- naphthalene group-containing copolyesters which may be formulated from the above lists of suitable polyester comonomers for PEN. In some applications, especially when PET serves as the first polymer, copolyesters based on PET and comonomers from said lists above (coPETs) are especially suitable. In addition, either first or second polymers may consist of miscible or immiscible blends of two or more of the above-described polymers or copolymers (such as blends of sPS and atactic polystyrene, or of PEN and sPS). The coPENs and coPETs described may be synthesized directly, or may be formulated as a blend of pellets where at least one component is a polymer based on naphthalene dicarboxylic acid or terephthalic acid and other components are polycarbonates or other polyesters, such as a PET, a PEN, a coPET, or a co-PEN.

Another preferred family of materials for the second polymer for some applications are the syndiotactic vinyl aromatic polymers, such as syndiotactic polystyrene. Syndiotactic vinyl aromatic polymers useful in the current invention include poly(styrene), poly(alkyl styrene)s, poly(aryl styrene)s, poly(styrene halide)s, poly(alkoxy styrene)s, poly(vinyl ester benzoate), poly(vinyl naphthalene), poly(vinylstyrene), and poly(acenaphthalene), as well as the hydrogenated polymers and mixtures or copolymers containing these structural units. Examples of poly(alkyl styrene)s include the isomers of the following: poly(methyl styrene), poly(ethyl styrene), poly(propyl styrene), and poly(butyl styrene). Examples of poly(aryl styrene)s include the isomers of poly(phenyl styrene). As for the poly(styrene halide)s, examples include the isomers of the following: poly(chlorostyrene), poly(bromostyrene), and poly(fluorostyrene). Examples of poly(alkoxy styrene)s include the isomers of the following: poly(methoxy styrene) and poly(ethoxy styrene). Among these examples, particularly preferable styrene group polymers, are: polystyrene, poly(p-methyl styrene), poly(m-methyl styrene), poly(p-tertiary butyl styrene), poly(p-chlorostyrene), poly(m-chloro styrene), poly(p-fluoro styrene), and copolymers of styrene and p-methyl styrene.

Furthermore, comonomers may be used to make syndiotactic vinyl aromatic group copolymers. In addition to the monomers for the homopolymers listed above in defining the syndiotactic vinyl aromatic polymers group, suitable comonomers include olefin monomers (such as ethylene, propylene, butenes, pentenes, hexenes, octenes or decenes), diene monomers (such as butadiene and isoprene), and polar vinyl monomers (such as cyclic diene monomers, methyl methacrylate, maleic acid anhydride, or acrylonitrile).

The syndiotactic vinyl aromatic copolymers of the present invention may be block copolymers, random copolymers, or alternating copolymers.

The syndiotactic vinyl aromatic polymers and copolymers referred to in this invention generally have syndiotacticity of higher than 75% or more, as determined by carbon-13 nuclear magnetic resonance. Preferably, the degree of syndiotacticity is higher than 85% racemic diad, or higher than 30%, or more preferably, higher than 50%, racemic pentad.

In addition, although there are no particular restrictions regarding the molecular weight of these syndiotactic vinyl aromatic polymers and copolymers, preferably, the weight average molecular weight is greater than 10,000 and less than 1,000,000, and more preferably, greater than 50,000 and less than 800,000.

The syndiotactic vinyl aromatic polymers and copolymers may also be used in the form of polymer blends with, for instance, vinyl aromatic group polymers with atactic structures, vinyl aromatic group polymers with isotactic structures, and any other polymers that are miscible with the vinyl aromatic polymers. For example, polyphenylene ethers show good miscibility with many of the previous described vinyl aromatic group polymers.

When a polarizing film is made using a process with predominantly uniaxial stretching, particularly preferred combinations of polymers for optical layers include PEN/coPEN, PET/coPET, PEN/sPS, PET/sPS, PEN/Eastar,™ and PET/Eastar,™ where "coPEN" refers to a copolymer or blend based upon naphthalene dicarboxylic acid (as described above) and Eastar™ is a polyester or copolyester (believed to comprise cyclohexanedimethylene diol units and terephthalate units) commercially available from Eastman Chemical Co. When a polarizing film is to be made by manipulating the process conditions of a biaxial stretching process, particularly preferred combinations of polymers for optical layers include PEN/coPEN, PEN/PET, PEN/PBT, PEN/PETG and PEN/PETcoPBT, where "PBT" refers to polybutylene terephthalate, "PETG" refers to a copolymer of PET employing a second glycol (usually cyclohexanedimethanol), and "PETcoPBT" refers to a copolyester of terephthalic acid or an ester thereof with a mixture of ethylene glycol and 1,4-butanediol.

Particularly preferred combinations of polymers for optical layers in the case of mirrors or colored films include PEN/PMMA, PET/PMMA, PEN/"Ecdel", PETP"Ecdel", PEN/sPS, PET/sPS, PEN/coPET, PEN/PETG, and PEN/a fluoropolymer commercially available from Minnesota Mining and Manufacturing Company (3M), St. Paul, Minn. under the trade designation "THV", where "PMMA" refers to polymethyl methacrylate, "coPET" refers to a copolymer or blend based upon terephthalic acid (as described above). and "PETG" refers to a copolymer of PET employing a second glycol (usually cyclohexanedimethanol).

For mirror films, a match of the refractive indices of the first polymer and second polymer in the direction normal to the film plane is preferred, because it provides for constant reflectance with respect to the angle of incident light (that is, there is no Brewster's angle). For example, at a specific wavelength, the in-plane refractive indices might be 1.76 for biaxially oriented PEN, while the film plane-normal refractive index might fall to 1.49. When PMMA is used as the second polymer in the multilayer construction, its refractive index at the same wavelength, in all three directions, might be 1.495. Another example is the PET/"Ecdel" system, in which the analogous indices might be 1.66 and 1.51 for PET, while the isotropic index of"Ecdel" might be 1.52. The crucial property is that the normal-to-plane index for one material must be closer to the in-plane indices of the other material than to its own in-plane indices. As described previously, it is sometimes preferred for the multilayer optical films of the current invention to consist of more than two distinguishable polymers. A third or subsequent polymer might be fruitfully employed as an adhesion-romoting layer between the first polymer and the second polymer within an optical stack, as an additional component in a stack for optical purposes, as a protective boundary layer between optical stacks, as a skin layer, as a functional coating, or for any other purpose. As such, the composition of a third or subsequent polymer, if any, is not limited. Preferred multicomponent films include those described in U.S. Ser. No. 09/066118 filed on even date under Attorney Docket No. 53543USA1A entitled "Multicomponent Optical Body", hereby incorporated by reference.

Optical Properties

The reflectance characteristics of multilayer films are determined by several factors, the most important of which for purposes of this discussion are the indices of refraction for each layer of the film stack. In particular, reflectivity depends upon the relationship between the indices of refraction of each material in the x, y, and z directions ($n_x$, $n_y$, $n_z$).

Different relationships between the three indices lead to three general categories of materials: isotropic, uniaxially birefringent, and biaxially birefringent. The latter two are important to the optical performance of the present invention.

Uniaxially Birefringent Materials (Mirrors)

In a uniaxially birefringent material, two indices (typically along the x and y axes, or $n_x$ and $n_y$) are equal, and different from the third index (typically along the z axis, or $n_z$). The x and y axes are defined as the in-plane axes, in that they represent the plane of a given layer within the multilayer film, and the respective indices n. and $n_y$ are referred to as the in-plane indices.

One method of creating a uniaxially birefringent system is to biaxially orient (stretch along two axes) a multilayer polymeric film. Biaxial orientation of the multilayer film results in differences between refractive indices of adjoining layers for planes parallel to both axes, resulting in the reflection of light in both planes of polarization. A uniaxially birefringent material can have either positive or negative uniaxial birefringence. Positive uniaxial birefringence occurs when the index of refraction in the z direction ($n_z$) is greater than the in-plane indices ($n_x$ and $n_y$). Negative uniaxial birefringence occurs when the index of refraction in the z direction ($n_z$) is less than the in-plane indices ($n_x$ and $n_y$). It can be shown that when $n_{1z}$ is selected to match $n_{2x}=n_{2y}=n_{2z}$ and the multilayer film is biaxially oriented, there is no Brewster's angle for p-polarized light and thus there is constant reflectivity for all angles of incidence. In other words, properly designed multilayer films that are oriented in two mutually perpendicular in-plane axes reflect an extraordinarily high percentage of incident light, and are highly efficient mirrors. By selecting the layers as previously described to reflect near infrared light, and positioning the reflective bandedge within the infrared region such that even at grazing angles of incidence the reflectance band does not shift into the visible region of the spectrum, an infrared mirror can be made that is transparent in the visible region of the spectrum, even at high angles of incidence. Alternatively, if some color is acceptable or desirable, the reflective bandedge may be positioned so that even at grazing angles of incidence, the reflectance band does not shift past the colored portion of the visible spectrum, thereby maintaining the same visible color at grazing angles as at normal angle of incidence. This same effect may be achieved by positioning two uniaxially oriented films (discussed below) with their respective orientation axes at 90° to each other.

Biaxially Birefringent Materials (Polarizers)

In a biaxially birefringent material, all three indices are different. Biaxially birefringent materials are important to the film of the present invention. A biaxially birefringent system can be made by uniaxially orienting (stretching along one axis) the multilayer polymeric film, such as along the x direction in FIG. 2. A biaxially birefringent multilayer film can be designed to provide high reflectivity for light with its plane of polarization parallel to one axis, for all angles of incidence, and simultaneously have low reflectivity (high transmissivity) for light with its plane of polarization parallel to the other axis at all angles of incidence. As a result, the biaxially birefringent system acts as a polarizer, reflecting light of one polarization and transmitting light of the other polarization. Stated differently, a polarizing film is one that receives incident light of random polarity (light vibrating in planes at random angles), and allows incident light rays of one polarity (vibrating in one plane) to pass through the film, while reflecting incident light rays of the other polarity (vibrating in a plane perpendicular to the first plane). By controlling the three indices of refraction—$n_x$, $n_y$, and $n_z$—the desired polarizing effects can be obtained. If the layers were appropriately designed to reflect light in the near infrared, and the reflective band positioned within the infrared region such that even at grazing angles of incidence the reflectance band does not shift into the visible region of the spectrum, an infrared polarizer can be made that is transparent in the visible region of the spectrum, even at high angles of incidence. Alternatively, if some color is acceptable or desirable, the reflective bandedge may be positioned so that even at grazing angles of incidence, the reflectance band does not shift past the colored portion of the visible spectrum, thereby maintaining the same visible color at grazing angles as at normal angle of incidence. Two crossed sheets of biaxially birefringent film would yield a highly efficient mirror, and the films would perform similar to a single uniaxially birefringent film.

A novel way of making multilayer polymeric polarizers using biaxial orientation is described U.S. Ser. No. 09/066455 filed on even date under Attorney Docket No. 53546USA5A entitled "An Optical Film and Process for Manufacture Thereof", hereby incorporated by reference. In this approach, two polymers capable of permanent birefringence are drawn sequentially such that in the first draw, the conditions are chosen to produce little birefringence in one of the materials, and considerable birefringence in the other. In the second draw, the second material develops considerable birefringence, sufficient to match the final refractive index of the first material in that direction. Often the first material assumes an in-plane biaxial character after the second draw. An example of a system that produces a good polarizer from biaxial orientation is PEN/PET. In that case, the indices of refraction can be adjusted over a range of values. The following set of values demonstrates the principle: for PEN, $n_{1x}=1.68$, $n_{1y}=1.82$, $n_{1z}=1.49$; for PET $n_{1x}=1.67$, $n_{1y}=1.56$ and $n_{1z}=1.56$, all at 632.8 nm. Copolymers of PEN and PET may also be used. For example, a copolymer comprising approximately 10% PEN subunits and 90% PET subunits by weight may replace the PET homopolymer in the construction. Indices for the copolymer under similar processing are about $n_{1x}=1.67$, $n_{1y}=1.62$, $n_{1z}=1.52$, at 632.8 nm. There is a good match of refractive indices in the x direction, a large difference (for strong reflection) in the y direction, and a small difference in the z direction. This small z index difference minimizes unwanted color leaks at shallow observation angles. The film formed by biaxial orientation is strong in all planar directions, while uniaxially oriented polarizer is prone to splitting. Depending on the application, either approach has merit.

To make an infrared reflecting film with minimal or no visible perceived color, the infrared reflecting multilayer film of the present invention may be designed so that the reflecting band is positioned within the infrared region at such a wavelength that it does not reflect red light at angles less than the angle of use. If the reflection band is not positioned sufficiently far into the infrared, then the film will reflect red at angles greater than the angle of use. Because cyan is by definition the subtraction of red light from white light, the film appears cyan in transmission. The amount of red light reflected, and thus the degree to which the film appears cyan, depends on the observation angle and the reflected band width. As shown in FIG. 1, the observation angle alpha is measured between the photoreceptor (typically a human eye) and the observation axis perpendicular to the plane of the film. When the observation angle is approximately zero degrees, very little visible light of any color is reflected by the multilayer film, and the film appears clear against a diffuse white background (or black against a black background). When the observation angle exceeds a predetermined shift angle and the short wavelength bandedge has not been positioned properly within the infrared, a substantial portion of the red light is reflected by the multilayer film, and the film appears cyan against a diffuse white background (or red against a black background). As the observation angle increases toward 90 degrees, more red light is reflected by the multilayer film, and the cyan appears to be even deeper. For some applications, the shift into the red region of the spectrum may be acceptable, for example, if the film is already cyan in appearance at normal angles, for example, because of the incorporation of an absorbing dye, then the short wavelength bandedge may shift beyond the visible into the red region so long as it does not move beyond the absorption bandedge of the dye to cause a change in the perceived color with angle.

One common description of reflectance band width depends on the relationship between the in-plane indices of refraction of the materials in the stack, as shown by the following equation:

$$\text{Band width} = (4\lambda/\pi)\sin^{-1}[(1-(n_2/n_1))/(1+(n_2/n_1))] \quad \text{Equation 3}$$

Thus, if $n_1$ is close to $n_2$, the reflectance peak is very narrow. For example, in the case of a multilayer film having alternating layers of PET ($n_1=1.66$) and Ecdel ($n_2=1.52$) of the same optical thickness, selected for $\lambda=750$ nm minimum transmission, the breadth or band width of the transmission minimum is about 42 nm. In the case of a multilayer film having alternating layers of PEN ($n_1=1.75$) and PMMA ($n_2=1.49$) under the same conditions, the band width is 77 nm. To reflect as much of the solar spectrum as possible without having higher order harmonics give perceptible color, the reflective band of the film of the present invention should be designed to cover from about 850 nm to about 1200 nm. The band width for a given pair of materials may be estimated from Equation 3, multiplying by the layer thickness ratio. The center of the reflectance band is calculated from Equations 1 or 2 so that it is positioned approximately one half band width from the desired location of the lower bandedge.

The value of the blue shift with angle of incidence in any thin film stack can be derived from the basic wavelength tuning formula for an individual layer, shown as Equation 4, below:

$$\lambda/4 = \Sigma n d \cos\theta \quad \text{Equation 4}$$

where $\lambda$=design wavelength (the bandedge will actually extend below $\lambda$)

$\theta$=angle of incidence measured from perpendicular in that layer n=index of refraction for the material layer for the given direction and polarization of the light traveling through the layer, and d=actual thickness of the layer.

In an isotropic thin film stack, only the value of $(\cos\theta)$ decreases as $\theta$ increases. In a birefringent film, however, both n and $(\cos\theta)$ decrease for p-polarized light as $\theta$ increases. When the unit cell includes one or more layers of a negatively birefringent material such as PEN, the p-polarized light senses the low z-index value instead of only the in-plane value of the index, resulting in a reduced effective index of refraction for the negatively birefringent layers. Accordingly, the effective low z-index caused by the presence of negatively birefringent layers in the unit cell creates a secondary blue shift in addition to the blue shift present in an isotropic thin stack. The compounded effects result in a greater blue shift of the spectrum compared to film stacks composed entirely of isotropic materials. The actual blue shift will be determined by the thickness weighted average change in $\lambda$ with angle of incidence for all material layers in the unit cell. Thus, the blue shift can be enhanced or lessened by adjusting the relative thickness of the birefringent layer(s) to the isotropic layer(s) in the unit cell. This will result in f-ratio changes that must first be considered in the product design. The maximum blue shift in mirrors is attained by using negatively uniaxially birefringent materials in all layers of the stack. The minimum blue shift is attained by using only uniaxially positive birefringent materials in the optical stack. For polarizers, biaxially birefringent materials are used, but for the simple case of light incident along one of the major axes of a birefringent thin film polarizer, the analysis is the same for both uniaxial and biaxial films. For directions between the major axes of a polarizer, the effect is still observable but the analysis is more complex.

For mirror films made with PEN with equal stretch ratios along the two major axes of the film, the in-plane/z-axis index differential of the PEN layers is about 1.75–1.50. This index differential is less for PET-based films (i.e., about 1.66–1.50). For polarizers, with light incident with the plane of polarization along the extinction axis, the effect is even more pronounced because the difference in the PEN in-plane index compared to the PEN z-axis index is much greater (about 1.85–1.50), resulting in an even greater blue shift for p-polarized light than that observed in isotropic multilayer film stacks. If only uniaxially positive birefringent materials were used in the stack, the blue shift would be diminished compared to isotropic optical films.

Figure 3:
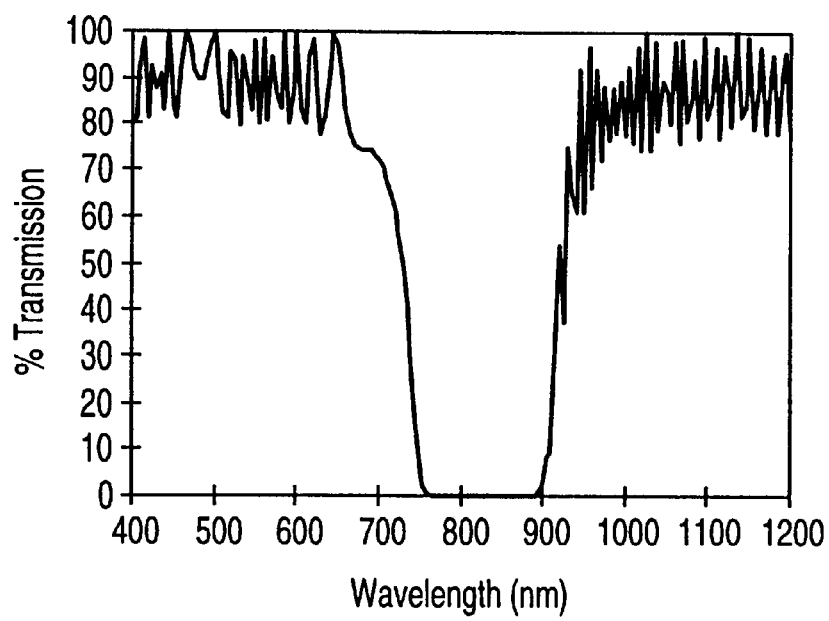
FIGS. 3–6 are transmission spectra associated with various actual and modeled film samples.
Figure 4:
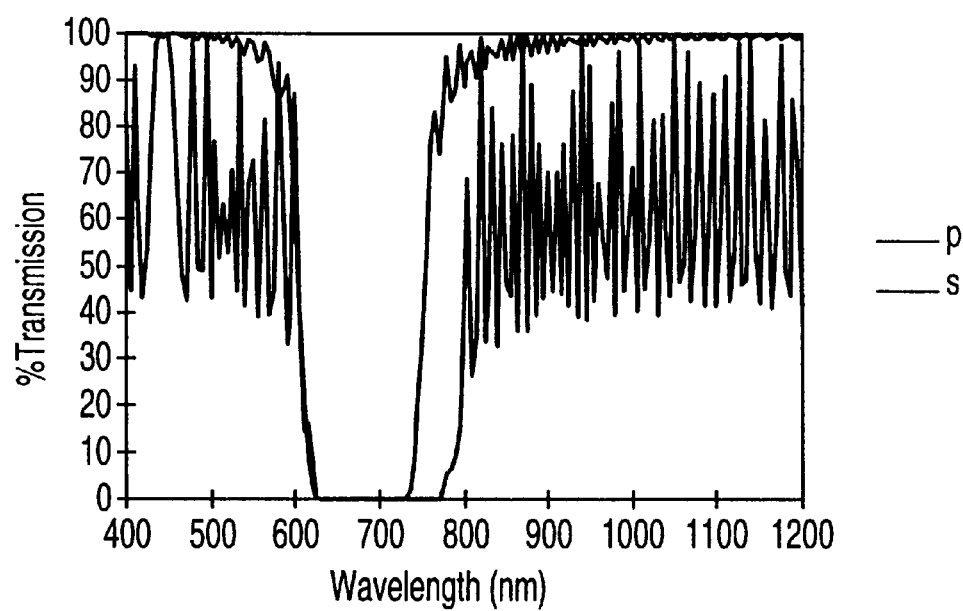

For the uniaxially birefringent case of PEN/PMMA, the angular dependence of the red light reflectance is illustrated in FIGS. 3 and 4. In those graphs, the percent of transmitted light is plotted along the vertical axis, and the wavelengths of light are plotted along the horizontal axis. Note that because the percentage of light transmitted is simply 1 minus the percentage of reflected light (absorption is negligible), information about light transmission also provides information about light reflection. The spectra provided in FIGS. 3 and 4 are taken from a computerized optical modeling system, and actual performance typically corresponds relatively closely with predicted performance. Surface reflections contribute to a decreased transmission in both the computer modeled and measured spectra. In examples for which actual samples were tested, a spectrometer available from the Perkin Elmer Corporation of Norwalk, Conn. under the designation Lambda 19 was used to measure optical transmission of light at the angles indicated.

A uniaxially birefringent film having a total of 224 alternating layers of PEN ($n_{x,y}=1.75$; $n_z=1.5$) and PMMA ($n_{x,y,z}=1.5$) with a linear ratio of thickest layer pairs to thinnest of 1.13:1 was modeled. The spectra for this ideal film at a zero degree observation angle and a 60 degree observation angle are plotted in FIGS. 3 and 4, respectively. The low wavelength bandedge for both the s- and p-polarized light shift together from about 750 nm to about 600 nm and transmission is minimized in the desired range of the spectrum, so that to the eye, a very sharp color shift is achieved. In fact, the concurrent shift of the s- and p-polarized light is a desirable aspect of the present invention. In FIGS. 3 and 4, this effect may be observed by determining whether the low wavelength bandedges of the s- and p-polarized light spectra are spaced apart or not.

For comparison, a 24 layer construction of zirconia and silica was modeled to demonstrate the shift observed for multilayer films made from isotropic materials.

Figure 5:
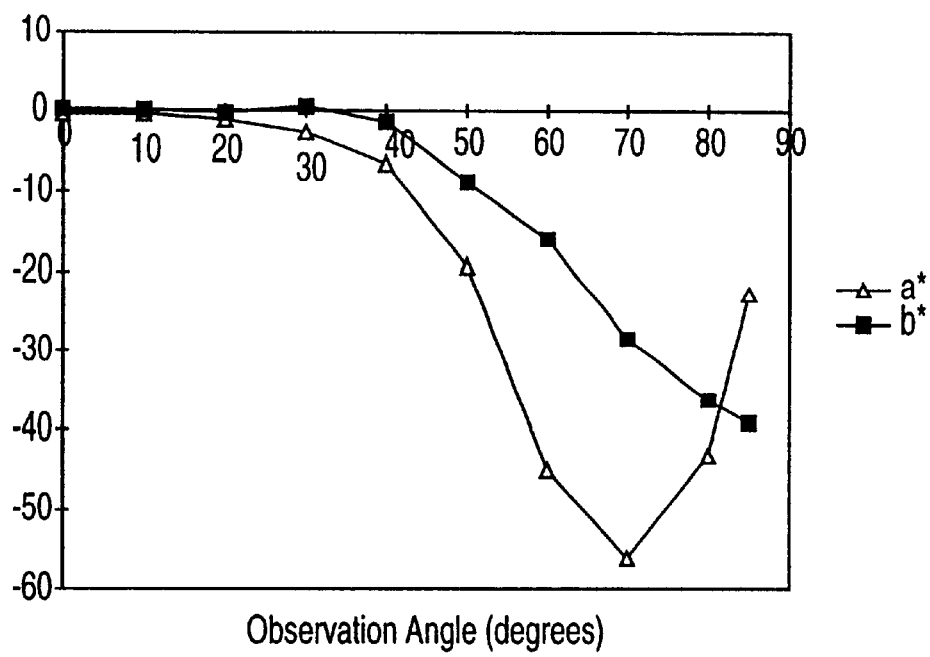
Figure 6:
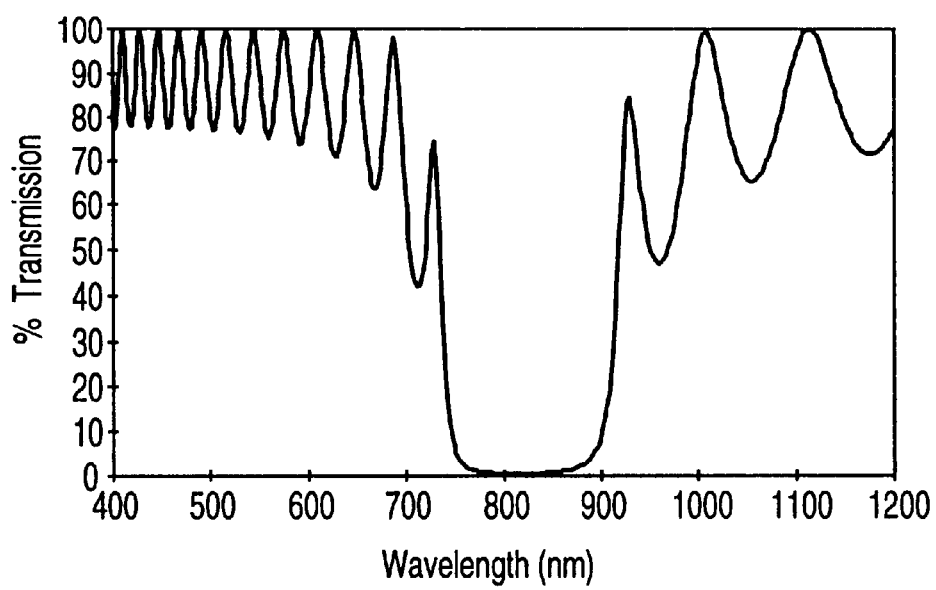

The refractive index of zirconia was $n_{x,y,x}=1.93$, the refractive index of silica was $n_{x,y,z}=1.45$, and the model assumed a linear layer thickness gradient in which the thickest layer pair was 1.12 times thicker than the thinnest layer pair. At a zero degree observation angle, the two films spectra look similar (compare FIG. 5 to FIG. 3), and to the naked eye, both would be clear. As shown in FIG. 6, however, the low wavelength bandedge for p-polarized light viewed at a 60 degree observation angle shifts by about 100 nm, while that for s-polarized light shifts by about 150 nm. This construction does not exhibit an abrupt change from clear to cyan because the s- and p-polarized light do not shift together with change in angle.

Typically, the value for the shift for p-polarized light for a construction with an isotropic film would likely be between the shift achieved using a birefringent film and that achieved using an inorganic isotropic film, depending on the index of refraction of the specific materials used.

It is believed that one way to design a multilayer film in which those bandedges are coincident is to choose materials with an F ratio of approximately 0.25. The F ratio, usually used to describe the F ratio of the birefringent layer, is calculated as shown in Equation 5:

$$F\ ratio = n_1 d_1/(n_1 d_1 + n_2 d_2)$$

where n and d are the refractive index and the actual thickness of the layers, respectively. When the F ratio of the birefringent layer is approximately 0.75, there is a significant separation between the lower bandedges of the s- and p-polarized light spectra, and when the F ratio is approximately 0.5, there remains a noticeable separation. At an F ratio of 0.25, however, the lower bandedges of the s- and p-polarized light spectra are virtually coincident, resulting in a film having a sharp color transition. Stated in different terms, it is most desirable to have the lower bandedges of the s- and p-polarized light spectra within approximately 20 nm of each other, and more desirable to have them within approximately 10 nm of each other, to obtain the desired effect. For the modeled cases of FIGS. 3–6, an F ratio of 0.5 has been used.

Figure 8:
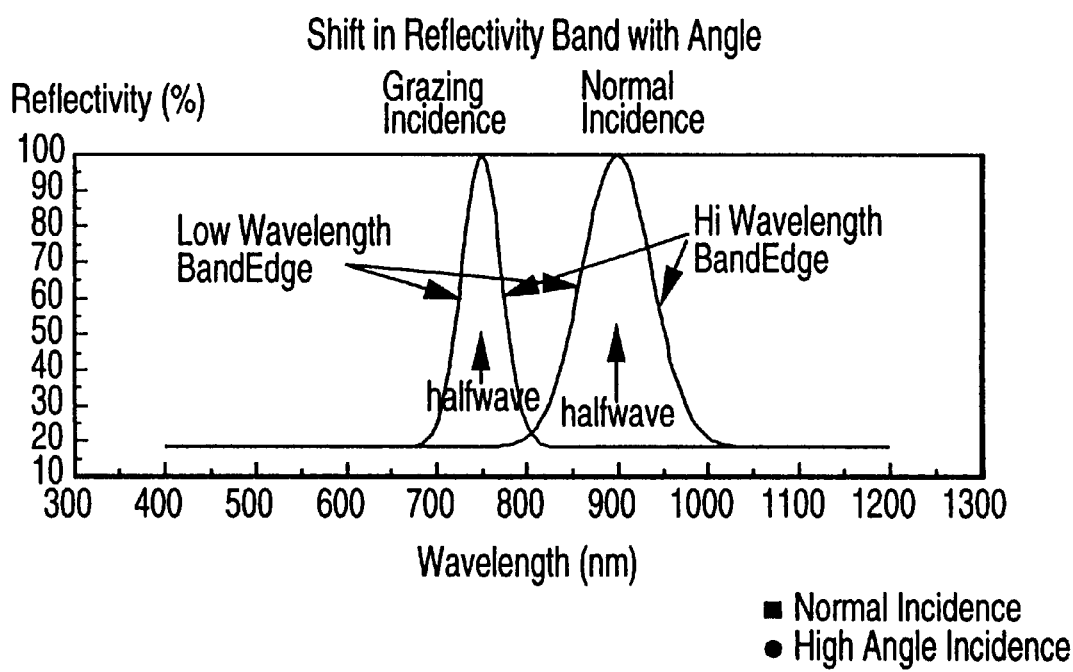
FIG. 8 is a reflectance spectrum showing a shift in the reflectivity band with angle.

The optical theory underlying the modeled data described above will now be described in greater detail. A dielectric reflector is composed of layer groups that have two or more layers of alternating high and low index of refraction. Each group has a halfwave optical thickness that determines the wavelength of the reflection band. Typically, many sets of halfwaves are used to build a stack that has reflective power over a range of wavelengths. Most stack designs have sharp reflectivity decreases at higher and lower wavelengths, know as bandedges. The edge above the halfwave position is the high wavelength bandedge, $l_{BEhi}$, and the one below is the low wavelength bandedge, $l_{BElo}$. These are illustrated in FIG. 8. The center, edges, and width of a reflection band change with incident angle.

The reflecting band can be exactly calculated by using a characteristic matrix method. The characteristic matrix relates the electric field at one interface to that at the next. It has terms for each interface and each layer thickness. By using effective indicies for interface and phase terms, both anisotropic and isotropic materials can be evaluated. The characteristic matrix for the halfwave is the product of the matrix for each layer of the halfwave. The characteristic matrix for each layer is given by Equation 6:

$$M_i = \begin{bmatrix} M_{11} & M_{12} \\ M_{21} & M_{22} \end{bmatrix} = \begin{bmatrix} \dfrac{\exp[\beta_i]}{t_i} & \dfrac{r_i \exp[-\beta_i]}{t_i} \\ \dfrac{r_i \exp[-\beta_i]}{t_i} & \dfrac{\exp[\beta_i]}{t_i} \end{bmatrix} \quad \text{Equation 6}$$

where $r_i$ and $t_i$ are the Fresnel coefficients for the interface reflection of the $i^{th}$ interface, and $b_i$ is the phase thickness of the $i^{th}$ layer.

The characteristic matrix of the entire stack is the product of the matrix for each layer. Other useful results, such as the total transmission and reflection of the stack, can be derived from the characteristic matrix. The Fresnel coefficients for the $i^{th}$ interface are given by Equations 7(a) and 7(b):

$$r_i = \frac{n_i - n_{i-1}}{n_i + n_{i-1}} \text{ and } t_i = \frac{2n_i}{n_i + n_{i-1}} \quad \text{Equations 7(a); 7(b)}$$

The effective indicies used for the Fresnel coefficients are given by Equations 8(a) and 8(b):

$$n_{is} = \frac{\sqrt{n_{ix}^2 - n_o^2 \sin^2 \theta_o}}{\cos \theta_o} \text{ (for } s \text{ polarized light)} \quad \text{Equation 8(a)}$$

$$n_{ip} = \frac{n_{ix} n_{iz} \cos \theta_o}{\sqrt{n_{iz}^2 - n_o^2 \sin^2 \theta_o}} \text{ (for } p \text{ polarized light)} \quad \text{Equation 8(b)}$$

When these indicies are used, then the Fresnel coefficients are evaluated at normal incidence. The incident material has an index of $n_o$ and an angle of $q_o$.

The total phase change of a halfwave pair, one or both may have anisotropic indicies. Analytical expressions for the effective refractive index were used. The phase change is different for s and p polarization. For each polarization, the phase change for a double transversal of layer i, b, is shown in Equations 9(a) and 9(b):

$$\beta_{is} = \frac{2\pi d_i}{\lambda} \sqrt{n_{ix}^2 - n_o^2 \sin^2 \theta_o} \text{ (for } s \text{ polarized light)} \quad \text{Equation 9(a)}$$

$$\beta_{ip} = \frac{2\pi d i}{\gamma} \frac{n_{ix}}{n_{is}} \sqrt{n_{iz}^2 - n_o^2 \sin^2 \theta_o} \text{ (for } p \text{ polarized light)} \quad \text{Equation 9(b)}$$

where $q_o$ and $n_o$ are the angle and index of the incident medium.

Born & Wolf, in *Principles of Optics*, Pergamon Press 6th ed, 1980, p. 66, showed that the wavelength edge of the high reflectance region can be determined by evaluating the $M_{11}$ and $M_{22}$ elements of the characteristic matrix of the stack at different wavelengths. At wavelengths where Equation 10 is satisfied, the transmission exponentially decreases as more halfwaves are added to the stack.

$$\left| \frac{M_{11} + M_{22}}{2} \right| \geq 1 \quad \text{Equation 10}$$

The wavelength where this expression equals 1 is the bandedge. For a halfwave composed of two layers, multiplying the matrix results in the analytical expression given in Equation 11.

$$\left|\frac{M_{11} + M_{22}}{2}\right| = \left|\cos(\beta_1)\cos(\beta_2) - \frac{1}{2}\left(\frac{n_{ld}}{n_{lo}} + \frac{n_{lo}}{n_{ld}}\right)\sin(\beta_1)\sin(\beta_2)\right| \geq 1$$

Equation 11

The edge of a reflection band can be determined from the characteristic matrix for each halfwave. For a halfwave with more than two layers, the characteristic matrix for the stack can be derived by matrix multiplication of the component layers to generate the total matrix at any wavelength. A bandedge is defined by wavelengths where Equation 11 is satisfied. This can be either the first order reflection band or higher order reflections. For each band, there are two solutions. There are additional solutions at shorter wavelengths where higher order reflections can be found.

Manufacture

Figure 7:
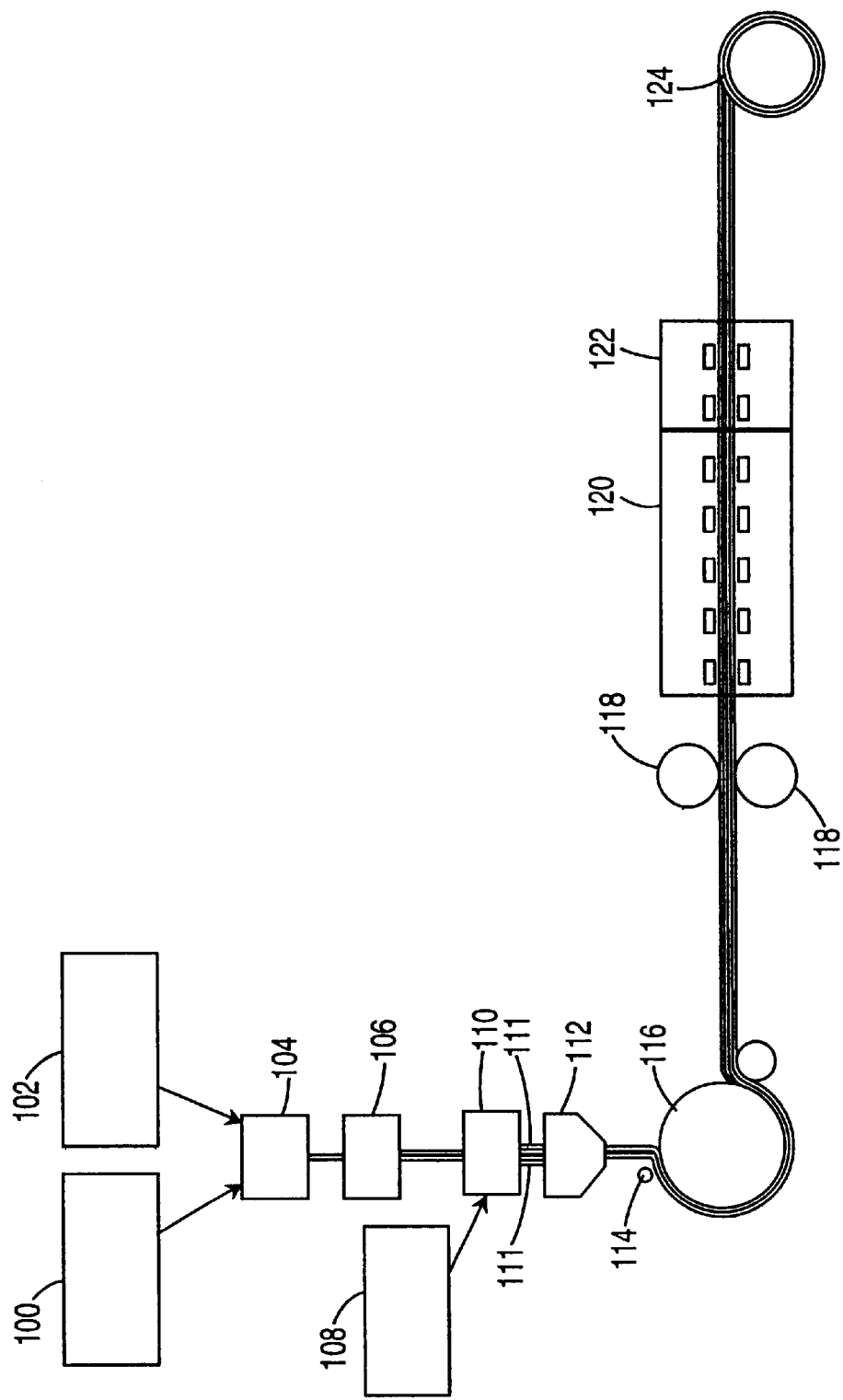
FIG. 7 is a schematic diagram of a manufacturing process for making a multilayer film useful in the optical body of the present invention.

A preferred method of making the multilayer film of the present invention is illustrated schematically in FIG. 7, and is described in even greater detail in U.S. Ser. No. 09/006288 entitled "Process for Making Multilayer Optical Films" filed on even date and having Attorney Docket No. 51932USA8A, the contents of which are incorporated herein by reference. To make multilayer optical films, materials 100 and 102 selected to have suitably different optical properties are heated above their melting and/or glass transition temperatures and fed into a multilayer feedblock 104, with or without a layer multiplier 106. The layer multiplier 106 splits the multilayer flow stream, and then redirects and "stacks" one stream atop the second to multiply the number of layers extruded. An asymmetric multiplier, when used with extrusion equipment that introduces layer thickness deviations throughout the stack, may broaden the distribution of layer thicknesses so as to enable the multilayer film to have layer pairs corresponding to a desired portion of the visible spectrum of light, and provide a desired layer thickness gradient. Skin layers may also be introduced by providing material 108 for skin layers to a skin layer feedblock 110.

The multilayer feedblock feeds a film extrusion die 112. Feedblocks useful in the manufacture of the present invention are described in, for example, U.S. Pat. Nos. 3,773,882 and 3,884,606, and U.S. Ser. No. 09/006288 entitled "Process for Making Multilayer Optical Films" filed on even date under Attorney Docket No. 51932USA8A, all of which hereby incorporated by reference. As an example, the extrusion temperature may be approximately 295° C., and the feed rate approximately 10–150 kg/hour for each material. It is desirable in most cases to have skin layers 111 flowing on the upper and lower surfaces of the film as it goes through feedblock 110 and before it goes through die 112. These layers 111 serve to dissipate the large stress gradient found near the wall, leading to smoother extrusion of the optical layers. Typical extrusion rates for each skin layer 111 would be 2–50 kg/hr (1–40% of the total throughput). The skin material may be the same as one of the optical layers, or a third polymer.

After exiting die 112, the melt is cooled on a casting wheel 116, which rotates past pinning wire 114. Pinning wire 114 pins the extrudate to casting wheel 116. The film then travels through lengthwise orientation pull rolls 118, tenter oven 120, heat set portion 122 of tenter oven 120 and then to wind up roll 124. To achieve a clear film over a broader range of angles, one need only make the film thicker by running the casting wheel more slowly. This moves the low bandedge farther away from the edge of the visible spectrum (700 nm). In this way, the color shift of the films of this invention may be adjusted for the desired color shift. The film is oriented by stretching at ratios determined with reference to the desired optical and mechanical properties. Stretch ratios of approximately 34 to 1 are preferred, although ratios as small as 2 to 1 and as large as 6 to 1 may also be appropriate to a given film. Stretch temperatures will depend on the type of birefringent polymer used, but 20 to 33° C. (50 to 60° F.) above its glass transition temperature would generally be an appropriate range. The film is typically heat set in the last two zones of tenter oven 120 to impart the maximum crystallinity in the film and reduce its shrinkage. Employing a heat set temperature as high as possible without causing film breakage in the tenter oven 120 reduces the shrinkage during a heated embossing step. A reduction in the width of the tenter rails by about 1–4% also serves to reduce film shrinkage. If the film is not heat set, heat shrink properties are maximized, which may be desirable in some security packaging applications.

A suitable multilayer optical body may also be prepared using techniques such as spin coating, M., as described, for example, in Boese et al., J. Polym. Sci.: Part B, 30:1321 (1992) for birefringent polyimides, and vacuum deposition, e.g., as described by Zang et. al., Appl. Phys. Letters, 59:823 (1991) for crystalline organic compounds; the latter technique is particularly useful for certain combinations of crystalline organic compounds and inorganic materials.

Orientation of the extruded film may be done by stretching individual sheets of the material in heated air. For economical production, stretching may be accomplished on a continuous basis in a standard length orienter, i.e., lengthwise orientation pull rolls 118, tenter oven 120, or both. Economies of scale and line speeds of standard polymer film production may be achieved thereby achieving manufacturing costs that are substantially lower than costs associated with commercially available absorptive polarizers.

Additional Layers and Features

In addition to the skin layer described above, which add physical strength to the film and reduce problems during processing, other layers and features of the inventive film may include slip agents, low adhesion backsize materials, conductive coatings, antistatic, antireflective or antifogging coatings or films, barrier layers, flame retardants, UV stabilizers or protective layers, abrasion resistant materials, opticalcoatings, or substrates to improve the mechanical integrity or strength of the film. Non-continuous layers may also be incorporated into the film to prevent tampering.

It may be desirable to add to one or more of the layers, one or more inorganic or organic adjuvants such as an antioxidant, extrusion aid, heat stabilizer, ultraviolet ray absorber, nucleator, surface projection forming agent, and the like in normal quantities so long as the addition does not substantially interfere with the performance of the present invention.

Lamination of two or more sheets together may be advantageous, to improve reflectivity or to broaden the bandwidth, or to form a mirror from two polarizers. Amorphous copolyesters are useful as laminating materials. Exemplary amorphous copolyesters include those commercially available from Goodyear Tire and Rubber Co. of Akron, Ohio, under the trade designations "VITEL Brand 3000" and "VITEL Brand 3300". The choice of laminating material is broad, with adhesion to the sheets 10, optical clarity and exclusion of air being the primary guiding principles.

A characteristic of dielectric multilayer thin interference films is that the reflected wavelength shifts to shorter wavelengths at higher angles of view. To ensure that the encroachment of the reflecting band on the visible range of wavelengths is acceptable, the thicknesses of the individual layer pairs are increased such that their resonant first order wavelengths occur at a higher wavelength than would normally be desired. This increase follows equation 11.

Since solar energy and some other light sources have significant emission in the near infrared, there may be a substantial loss of the film's efficiency if the gap which has been created is not filled. Furthermore, while the gap is generally filled off-angle by the wavelength shift, many industry standard tests for energy efficiency of windows only involve measurements at normal incidence.

Wavelength Gap Filler Component

The optical body of the present invention further include a wavelength gap filler component in conjunction with the film described above. The gap filler component functions to either absorb or reflect the infrared wavelengths that are not reflected by the film at normal angles because of the need to shift the reflective band of the film to higher wavelengths in order to minimize perceived color changes at non-normal incidence. Depending on the placement of the gap filler component relative to the film, the component may not function at non-normal angles because the reflective band shifts to lower wavelengths, preferably coinciding with the wavelength region of the absorption or reflection of the gap filler component. Suitable gap filler components include an infrared absorbing dye or pigment, an infrared absorbing glass, a trailing segment, a plurality of isotropic layers, or combinations thereof. The gap filler component may be a part of the film, for example, as a trailing segment or a plurality of isotropic layers coextruded with the film layers or as a dye or pigment incorporated into one or more of the film layers. Alternatively, the gap filler component may be a discrete part of the optical body of the present invention, i.e., separate from the film, that is attached, for example, laminated thereto. Examples of this embodiment include a dye or pigment as a separate layer adhered to the film. The description of the gap filler as a part of the film and separate from the film is merely exemplary. The gap filler component disclosed herein may be either be a part of the film or may be separate from the film depending on the characteristics of the component itself and the film with which it is being combined.

The film and the gap filler components are preferably combined such that the film is placed on a surface nearest the sun as practical because it is more efficient to reflect solar energy than to absorb it. In other words, where possible, it is preferable that the sun's rays first encounter the film and then secondarily encounter the gap filler component. In a multiple pane or two-ply windshield, the most preferable placement for the film is the exterior nearest the sun, the next preferably position is between the panes or plies. The film may be placed on the interior surface but this allows absorption of solar light by the glass before the light reaches the film and absorption of part of the light reflected from the film. This embodiment may be preferable when considered from a UV protection standpoint, since it may be preferable to position the film away from the sun, allowing components which are less sensitive to UV to absorb this part of the light.

Examples of suitable infrared absorbing dyes include cyanine dyes as described, for example, in U.S. Pat. No. 4,973,572, hereby incorporated by reference, as well as bridged cyanine dyes and trinuclear cyanine dyes as described, for example, in U.S. Pat. No. 5,034,303, hereby incorporated by reference, merocyanine dyes as described, for example, in U.S. Pat. No. 4,950,640, hereby incorporated by reference, carbocyanine dyes (for example, 3,3'-diethyloxatricarbocyanine iodide, 1,1',3,3,3',3'-hexamethylindotricarbocyanine perchlorate, 1,1',3,3,3',3'-hexamethylindotricarbocyanine iodide, 3,3'-diethylthiatricarbocyanine iodide, 3,3'-diethylthiatricarbocyanine perchlorate, 1,1',3,3,3',3'-hexamethyl-4,4',5,5'-dibenzo-2,2'-indotricarbocyanine perchlorate, all of which are commercially available from Kodak, Rochester, N.Y.), and phthalocyanine dyes as described, for example, in U.S. Pat. No. 4,788,128, hereby incorporated by reference; naphthaline dyes; metal complex dyes, for example, metal dithiolate dyes (for example, nickel dithiolate dyes and, for example, bis[4-dimethylaminodithiobenzil] nickel, bis[dithiobenzil] nickel, bis[1,2-bis(n-butylthio)ethene-1,2-dithiol]nickel, bis [4,4'-dimethoxydithiobenzil] nickel, bis[dithiobenzil] platinum, bis[dithioacetyl] nickel) and metal dithiolene dyes (for example, nickeldithiolene dyes as described, for example, in U.S. Pat. No. 5,036,040, hereby incorporated by reference); polymethine dyes such as bis(chalcogenopyrylo) polymethine dyes as described, for example, in U.S. Pat. No. 4,948,777, hereby incorporated by reference, bis(aminoaryl) polymethine dyes as described, for example, in U.S. Pat. No. 4,950,639, hereby incorporated by reference, indene-bridged polymethine dyes as described, for example, in U.S. Pat. No. 5,019,480, hereby incorporated by reference, and tetraaryl polymethine dyes; diphenylmethane dyes; triphenylmethane dyes; quinone dyes; azo dyes; ferrous complexes as described, for example, in U.S. Pat. No. 4,912,083, hereby incorporated by reference; squarylium dyes as described, for example, in U.S. Pat. No. 4,942,141, hereby incorporated by reference; chalcogenopyrylo-arylidene dyes as described, for example, in U.S. Pat. No. 4,948,776, hereby incorporated by reference; oxoindolizine dyes as described, for example, in U.S. Pat. No. 4.948.778, hereby incorporated by reference; anthraquinone and naphthoquinone derived dyes as described, for example, in U.S. Pat. No. 4,952,552, hereby incorporated by reference; pyrrocoline dyes as described, for example, in U.S. Pat. No. 5,196,393, hereby incorporated by reference; oxonol dyes as described, for example, in U.S. Pat. No. 5,035,977, hereby incorporated by reference; squaraine dyes such as chromylium squaraine dyes, thiopyrylium squaraine dyes as described, for example, in U.S. Pat. No. 5,019,549, hereby incorporated by reference, and thiochromylium squaraine dyes; polyisothianaphthene dyes; indoaniline and azomethine dyes as described, for example, in U.S. Pat. No. 5,193,737, hereby incorporated by reference; indoaniline methide dyes; tetraarylarinium radical cation dyes and metallized quinoline indoaniline dyes. Squarylium dyes or squaraines are also described, for example, in U.S. Pat. No. 4,942,141 and U.S. Pat. No. 5,019,549, both of which are hereby incorporated by reference.

Commercially available phthalocyanine dyes include, for example, those available from Zeneca Corporation, Blackley, Manchester, England under the trade designation "Projet Series" for example, "Projet 830NP", "Projet 860 NP" and "Projet 900NP".

Commercially available metal complex dyes include those available from C.C. Scientific Products, Ft. Worth, Tex. 76120, for example, bis[4-dimethylaminodithiobenzil] nickel.

Additional suitable dyes include those described in Jurgen Fabian's article entitled "Near Infrared Absorbing Dyes" Chem Rev, 1992, 1197–1226 and "The Sigma Aldrich Handbook of Stains, Dyes and Indicators" by Floyd J. Green, Aldrich Chemical Company, Inc., Milwaukee, Wis.

ISBN 0-941633-22-5, 1991, both of which are hereby incorporated by reference. Useful near infrared absorbing dyes include those from Epolin, Inc., Newark, N.J., for example, having the trade designations: Epolight III-57, Epolight III-1 17, Epolight V-79, Epolight V-138, Epolight V-129, Epolight V-99, Epolight V-1 30, Epolight V-149, Epolight IV-66, Epolight IV-62A, and Epolight III-189.

Suitable infrared absorbing pigments include cyanines, metal oxides and squaraines. Suitable pigments include those described in U.S. Pat. No. 5,215,838, incorporated herein by reference, such as metal phthalocyanines, for example, vanadyl phthalocyanine, chloroindium phthalocyanine, titanyl phthalocyanine, chloroaluminum phthalocyanine, copper phthalocyanine, magnesium phthalocyanine, and the like; squaraines, such as hydroxy squaraine, and the like; as well as mixtures thereof. Exemplary copper pthalocyanine pigments include the pigment commercially available from BASF under the trade designation "6912". Other exemplary infrared pigments include the metal oxide pigment commercially available from Heubach Langelsheim under the trade designation "Heucodor".

Dyes or pigments useful in the present invention may be narrow-band absorbing, absorbing in the region of the spectrum not covered because of the position of the short wavelength bandedge of the optical body, for example, 700 to 850 nm, or may be broad band, absorbing over substantially all or all of the infrared region.

The dye or pigment can be applied to either surface of the film, in a layer of glass or polymer, such as polycarbonate or acrylic, laminated to the film, or be present in at least one of the polymer layers of the film. From a solar energy standpoint, the dye is preferably on the innermost surface of the film (i.e. toward the room interior and away from the sun) so that when the sun is a high angle, the film reflective band shifts to lower wavelengths, essentially coinciding with the wavelength region of the dye. This is preferred because reflecting solar energy away from the building is preferred to absorbing it.

The amount of dye or pigment used in the optical body of the present invention varies depending on the type of dye or pigment and/or the end use application. Typically, when applied to the surface of the film, the dye or pigment is present on the surface at a concentration and coating thickness suitable to accomplish the desired infrared absorption and visible appearance. Typically, if the dye or pigment is within an additional layer or within the multilayer optical body, the concentration ranges from about 0.05 to about 0.5 weight %, based on the total weight of the optical body. In addition, when a pigment is used, a small particle size typically is needed, for example, less than the wavelength of light. If the dyes are non-polar solvent soluble, the dyes can be coated or mixed in with solid plastic pellets and extruded if the dyes can withstand the heat of mixing and extrusion.

Examples of suitable infrared absorbing glasses include clear glass having a thickness generally ranging from about 3 to about 6 mm, such as architectural or automotive glass; blue glass; or green glass which selectively absorb in the near infrared, i.e., about 700 to 1800 nm.

In the embodiments where blue or green glass is used, it is preferable that the film of the present invention is located on the surface of the glass closest to the sun so that the film can reflect away the 850–1250 nm wavelengths, allowing some of the infrared which is not reflected to be absorbed by the glass. If it is not practical to place the film on the exterior surface of a glass layer, for example, on the exterior of a window of a building, it may be useful to place the film between panes of glass, rather than on the surface closest to the interior, in the case of multiple pane windows, in order to minimize absorption. Preferably, the exterior layer (closest to the sun) has minimal infrared absorbing properties so that the film is able to reflect light in the infrared region before this light reaches the interior infrared absorbing glass. In this embodiment, tile glass temperature would be lower and less heat would enter the room due to re-radiation of absorbed light. Additionally, the glass and/or film would be cooler which would reduce cracking of the glass due to thermal stress, a common problem with heavily absorbing materials.

Infrared absorbing glass is available commercially from companies including Pittsburgh Plate Glass (PPG), Guardian, Pilkington-Libbey Owens Ford, Toledo, Ohio.

Generally a sharp band edge is desired in optical interference films such as the infrared reflective films described herein. Sharp band edges can be obtained from proper design of the layer thickness gradient throughout the multilayer optical stack, as described in U.S. Ser. No. 09/006085 entitled "Optical Film with Sharpened Bandedge" filed by on even date under Attorney Docket No. 53545USA7A. Instead, a reflective film of the present invention can be designed to include a trailing segment to partially reflect infrared wavelengths in the gap region without producing strong color in the visible spectrum at non-normal angles. A trailing segment can be provided as a multilayer interference film have layer thicknesses and refractive indices such that the reflectance in the gap region is relatively weak, for example, 50% and which may decrease so that transfer from high reflectance to low reflectance of the multilayer film is gradual For example, a layer gradient may provide a sharp bandedge above, for example, the 50% reflectance point and a trailing segment could be provided by additional layers. For example, instead of providing a sharp edge, the last 30 layers of a 200 layer stack could be of appropriate optical thickness that their first order reflection occurs in the range of about 800–850 nm, the intensity of which increase from about 90% reflection at 850 nm to about 25% at 800 nm. The other 170 layers could provide, for example, about 90% reflection from about 850–1150 nm. Achieving the trailing segment can be done in a number of ways, for example, by controlling the volumetric feed of the individual layers. The trailing segment may be extruded with the multilayer film of the present invention or laminated thereto.

Possible advantages of a trailing segment is that instead of an abrupt transition from no color to maximum color, the trailing segment provides a "softer" transition which may be more aesthetically acceptable and easier to control from a process standpoint.

An isotropic multilayer film, as described above, could also be used to cover at least a portion of the wavelength gap. The optical body of the present invention may comprise the combination of any film described herein and any gap filler component described herein, with the proviso that when a polymeric isotropic material is selected as the film, the gap filler component is not a polymeric isotropic material and when a polymeric isotropic material is selected as the gap filler component, the film is not selected to be a polymeric isotropic material.

Isotropic layers lose p-pol reflection intensity at oblique angles. If a birefringent film is used as the multilayer film, for example, PEN/PMMA, isotropic layers can be used to cover at least a portion of the gap. Accordingly, at oblique angles, the z-index matched reflectance band would shift into the gap and the reflectance from the isotropic layers would shift to the visible but also decrease in p-pol intensity. S-pol would be masked or partially masked by the air/optical body surface which would increase its reflectance at oblique angles. Exemplary isotropic polymers include but are not limited to isotropic coPEN, PMMA, polycarbonates, styrene acrylonitriles, PETG, PCTG, styrenics, polyurethanes, polyolefins, and fluoropolymers. The isotropic film could be coextruded with the film of the present invention or laminated to this film.

Gap filler components may be used in combination with the multilayer film of the present invention, for example, when each gap filler component only absorbs or reflects in a portion of the gap to be filled. In addition, shifting the bandedge and, thus, creating the gap, also serves to create another, or second, gap in the infrared region at longer wavelengths off angle. Therefore, it may be preferable to also include a component which fills this second gap region off angle. The present invention also encompasses an optical body comprising a birefringent or isotropic dielectric multilayer film, as described above, in combination with a gap filler component which only fills the second gap in the infrared region at longer wavelengths off angle. Suitable gap filler components to fill this second gap include dyes, pigments, glasses, metals and multilayer films which absorb or reflect in the longer wavelengths of the infrared region, as described above.

Preferably, gap filler component (a) is situated such that light hits the multilayer film of the present invention before it hits the gap filler component so that, then when the sun is at normal incidence, the gap filler absorbs light in the region of the gap. However, when the sun is at high angles, the film will shift to some of the same wavelengths as the gap filler component and serve to reflect at least some of the light in the region of the gap.

Optional Elements

A multilayered infrared optical body in accordance with the present invention may be combined with a transparent conductor to provide a transparent multilayer optical body having broader reflectivity. In particular, the transparent conductor provides good far infrared refection (above about 2500 nm) although its reflectivity in the near infrared region of the spectrum generally is not as good throughout the region of about 700 nm to about 2500 nm. The optical body of the present invention can be designed or "tuned" to provide the desired infrared reflection while still transmitting sufficient light to be transparent.

The transparent conductors useful in the present invention are those that reflect light in the far infrared region of the spectrum, and more particularly include those effective in efficiently partitioning infrared light (above about 700 nm) from visible light (between about 380 nm and about 700 nm). In other words, the transparent conductor passes light in the wavelength region sensitive to the human eye while rejecting light in the infrared region. Because both high visible transmission and low near infrared transmission are desired, the reflective edge necessarily must be above about 700 nm, just out of the sensitivity of the human eye. Suitable transparent conductors are electrically conductive materials that reflect well in the far infrared spectrum and include metals, metal alloys, and semiconductive metal oxide materials. Preferred metals include silver, gold, copper, and aluminum. Other metals, such as nickel, sodium, chromium, tin, and titanium, may also be used, but they generally are not as effective in partitioning infrared light from visible light. Silver is particularly preferred since it can be applied in the form of a very thin film and optically has a relatively high transmittance over the entire visible light region while also possessing the ability to reflect light of longer wavelengths than visible light. Preferred semiconductive metal oxides include doped and undoped tin dioxide ($SnO_2$), zinc oxide (ZnO), and indium tin oxide (ITO) with the latter being particularly preferred. Preferred metal alloys include silver alloys, stainless steel, and inconel. Silver alloys, especially those containing at least 30 wt. % silver, are particularly preferred for the same reasons that silver is preferred, but have the added advantage of improved durability, such as a silver alloy containing, in addition to silver, less than 50 wt. % gold and/or less than 20 wt. % copper. The transparent conductor may comprise a single metal layer or a plurality of layers, each of which may contain one or more metals, metal alloys, and metal oxides.

Metals and metal alloys useful as transparent conductors in the present invention have electrical conductivities ranging between about 0.02 mhos/sq. to about 1.0 mhos/sq., preferably between about 0.05 mhos/sq. to about 1.0 mhos/sq., and may be applied in a thickness from about 10 nm to about 40 nm, preferably between about 12 nm to about 30 nm. Preferred semiconductive metal oxide layers have an electrical conductivity ranging between about 0.0001 mhos/sq. to about 0.1 mhos/sq., preferably between about 0.001 mhos/sq. to about 0.1 mhos/sq., and may be applied in a thickness from about 20 nm to about 200 nm, preferably from about 80 nm to about 120 nm. Where the transparent conductor is a metalized polymer or glass sheet laminated to the multilayered polymer film, the metal or metal alloy coatings on the sheet preferably have a thickness from about 10 nm to about 40 nm, while metal oxide coatings on the sheet preferably have a thickness from about 20 nm to about 200 nm.

Although thin metal transparent conductors, such as silver, may be sufficiently thin to have high visible transmissions, their reflectivity in the near infrared region between about 700 nm and about 1200 nm is not as good as compared to the reflectivity that can be achieved in that region by the multilayered polymer films used in the present invention. In contrast, the multilayered polymer films described above have high transmission of visible light and comparatively good reflection in the near infrared region with relatively low to poor reflectivity in the far infrared region. The multilayered polymer films are also generally capable of providing a sharper transition between visible and infrared light than the transparent conductors. Thus, the combination of the multilayered polymer film with the transparent conductor to form the transparent multilayer optical body of the present invention provides better reflectivity throughout the entire infrared region while still transmitting visible light. In addition, antireflective coatings, which are well known to those of ordinary skill in the art, may be coated over the transparent conductor to increase the transmission of visible light. This includes, for example, an antireflective coating consisting of a metal, dielectric, metal stack with the individual layer thicknesses controlled to provide the desired visible transmission. However, such antireflective coatings are not required by the present invention to obtain the desired transmission of light in the visible spectrum.

In a two component film, for example, the bandwidth of this reflectivity in the infrared region, however, is also dependent upon color and/or the level of transmission desired in the visible range since overtones and third order effects, which occur for first orders above about 1150 nm, will undesirably increase reflection in the visible spectrum as is well known to those of ordinary skill in this art. One way to avoid significantly impacting deleteriously the transmission of visible light is to control the thicknesses of the individual layers in the multilayered polymer film as discussed above to limit the reflection band in the near infrared spectrum to a preselected range, such as between 700 nm and about 1150 nm where the solar spectrum is more intense than further out in the infrared spectra. In such an embodiment, the desired transmission in the visible spectrum will be maintained, and the combination of transparent conductor and multilayered polymer film will reflect the desired amount of light, with the multilayer film dominating the reflection in the near infrared from about 700 nm to about 1150 nm, and the transparent conductor dominating the reflection in the infrared spectrum above about 1150 nm. Other ways to achieve this result are also known in the art. See, for example, Alfred Thelen, "Multilayer Filters with Wide Transmittance Bands," J. Opt. Soc. Am. 53 (11), 1963, p. 1266, and Philip Baumeister, "Multilayer Reflections With Suppressed Higher Order Reflection Peaks," Applied Optics 31 (10), 1992, p. 1568, and U.S. Pat. Nos. RE 34,605 and 5,360,659 and U.S. Ser. No. 09/006118 entitled "Multicomponent Optical Body" filed on even date under Attorney Docket No. 53543USA1A. In these other designs, which suppress additional orders, one may determine the maximum first order bandwidth extent into the infrared without encroaching into the visible blue region by an unsuppressed overtone.

The transparent conductor may be applied to the multilayered polymer films by conventional coating techniques well-known to those of ordinary skill in this art, with the understanding that the resulting multilayered optical body is transparent. Such known processes include pyrolysis, powder coating, vapor deposition, cathode sputtering, ion plating, and the like. Cathode sputtering and vapor deposition are often preferred in view of the uniformity of structure and thickness that can be obtained. Alternately, the transparent conductor may be a separate metalized polymer or glass sheet that is laminated to the multilayered polymer film by means of a suitable adhesive, preferably a hot melt adhesive such as the VITEL 3300 adhesive from Shell Chemical Company, Akron, Ohio, or a pressure sensitive adhesive such as 90/10 IOA/AA and 95/5 IOA/acrylamide acrylic PSAs from Minnesota Mining and Manufacturing Company (3M), St. Paul, Minn.

The thickness of the transparent conductor applied to the multilayered polymer films to form the transparent multilayer optical body of the present invention can be selected to provide the desired reflectivity. In general, the thinner the metal layer, the more light in the visible spectrum will be transmitted. However, because the electrical conductivity of the metal layer decreases as its thickness decreases, the amount of light reflected in the far infrared spectrum also decreases as the thickness of the metal layer decreases. Accordingly, by adjusting the thickness of the metal layer for any particular metal, metal alloy, or semiconductive metal oxide, the transparent conductor can provide the desired balance between transmission of light in the visible spectrum and reflection of light in the far infrared spectrum. Moreover, the thickness of the metal layer deposited on the multilayered polymer film can be monitored by measuring the metal layer's electrical conductivity.

Shading Coefficient

The optical body of the present invention generally has no perceived color change with a change in viewing angle or angle of incidence of impinging light, and is preferably uncolored, and has a modest shading coefficient. The shading coefficient is the amount of solar energy that enters a window as compared to that of a simple pane of clear glass, and can be measured as follows:

The measured sample transmission spectra is multiplied by the sensitivity function of the human eye integrated over the visible spectrum and is referred to as $T_{lum}$. The measured sample reflection ($R_{AM2}$) and transmission spectra ($T_{AM2}$) are integrated over air mass 2 solar spectrum according to ASTM E903, "Standard Test For Solar Absorbance, Reflectance, and Transmittance of Materials Using Integrating Spheres." The dominant wavelength is the apparent color of the sample that is calculated with CIE techniques using Illuminant C and the 100 observer according to ASTM E308, "Standard Test Method for Computing The Colors of Objects Using the CIE System." The color purity is the saturation of the color, with 0% being white and 100% being a pure color. The shading coefficient is calculated from the air mass 2 integrated R and T spectra of the silveroated multilayered polymer film by the following formula:

$$SC = T^s_{AM2} + f \times (100 - T^s_{AM2} - R^s_{AM2})$$

where f is the inward flowing fraction of the absorbed solar energy.

The lower the shading coefficient value, the lower the amount of solar heat entering a room. The gap filler component creates a lower shading coefficient at normal angles. The optical body of the present invention preferably has a shading coefficient of less than 0.6.

Uses of the Optical Body

The optical body of the present invention have desirable optical properties in that they reflect and/or absorb the desired amount of light in the infrared region of the spectrum, and preferably transmitting sufficient light in the visible region of the spectrum to be transparent. Thus, the optical body of the present invention controls the amount of solar energy that passes through it preferably without significantly decreasing the intensity or changing the color of light sensed by the human eye at any angle.

By keeping out light in the infrared region, the optical body of the present invention aids in reducing required cooling in summer. Consequently, the optical body can be used by applying it directly to the surface of a glass or plastic substrate, such as an exterior window in a building or the windshield or window of an automobile, truck or aircraft. It is also suitable for laminated glass and plastic articles in which at least one transparent multilayer optical body is sandwiched between pairs of glass or plastic panes. Other uses would be apparent to those of ordinary skill in this art where protection is desired from infrared radiation while still obtaining substantial transparency to light in the visible region of the spectrum, such as, for example, applying the transparent multilayer optical body of the present invention to the window in a door to a refrigerated display case.

When the transparent multilayer optical body of the present invention are applied to a window in a house or automobile to reflect solar heat, such as during the summer, preferably the gap filler is next to the interior surface of the window and the multilayered polymer film faces the house or automobile interior. The outer surface of the multilayered polymer film may be covered by an abrasion resistant coating, as is well known in the art. Where it is desired to reflect radiant heat from the room back into the room during colder weather, the transparent conductor is preferably positioned facing the room or automobile interior. In addition, a protective polyolefin film, such as, for example, a polypropylene film, may be used to cover the optical body, if low emissivity is desired, to maintain the reflectance in the far infrared region. Such constructions are well known to those of ordinary skill in the art. If the multilayer optical body of the present invention are used on the exterior of such windows, durability of the optical body is a concern. Accordingly, a protective UV-stabilized polyester or acrylic film layer may be laminated directly to the optical body.

In order to more fully and clearly describe the present invention so that those skilled in the art may better understand how to practice the present invention, the invention will now be described by way of the following examples. The examples are intended to illustrate the invention and should not be construed as limiting the invention disclosed and claimed herein in any manner.

EXAMPLES

Example 1

99.87% by weight 0.56 intrinsic viscosity (IV) PEN commercially available from Eastman Chemical Co., Knoxville, Tenn. under the trade designation "PEN 19109" and 0.13% by weight of a phthalocyanine dye commercially available from Zeneca Corp., Manchester, United Kingdom, under the trade designation "Pro-Jet 830NP" were mixed together and extruded, at a temperature of 555° F. (291° C.) in a 1¼"extruder commercially available from Killion, Inc., Cedar Grove, N.J. into a three layer construction with the outer layers being the PEN:dye mixture and the inner layer being 100%/o by weight PEN. All three layers were approximately 0.004 inches (0.001 mm).

Example 2

A 210 layer infrared film of PEN:PMMA which was approximately 85% transmissive in the visible wavelength region was coated with PMMA in toluene commercially available from Rohm & Haas under the trade designation "B48S" diluted further with additional toluene to 27% solids. The coating was applied with a #12 meyer bar commercially available from RD.S. Co., Webster, N.Y., and dried in an oven for 10 minutes at 210F. (99° C.) to produce a 7 μm thick coating on both sides of the film. Transmission and spectral ringing was measured; the transmission was found to have increased to about 89% and the spectral ringing near the bandedge was reduced as compared to the film without a coating.

Example 3

Four samples of a 224 layer multilayer infrared reflecting film consisting of PEN:PMMA layers were prepared. The first sample had no coating, and the second, third and fourth samples was coated with a dye at thickness of 2 μm, 3.5 μm, and 7.3 μm, respectively, on the surface of the outer PEN skin layer using the meier bar technique. The dye was a phthalocyanine dye commercially available from Zeneca Corp., Manchester, United Kingdom, under the trade designation "Pro-Jet 830NP" at a concentration of 3% by weight.

Solar properties for each sample are provided below.

|          | Shading Coefficient | Visible Transmission |
|----------|--------------------|--------------------|
| Sample 1 | 0.74 | 85.4% |
| Sample 2 | 0.65 | 78.3% |
| Sample 3 | 0.61 | 74.4% |
| Sample 4 | 0.56 | 67.3% |

The shading coefficient is 1.15 (TST+0.27 (SA)), where TST is total solar transmission from 300–2500 nm and SA is solar absorption from 300–2500 nm.

Since a lower value of shading coefficient means that less solar heat enters a room, this data show an improvement in performance using a dye in accordance with the present invention.

Other modifications and variations of the present invention are possible in light of the above teachings. It is to be understood, however, that changes may be made in the particular embodiments described above which are within the full intended scope of the invention as defined in the appended claims.

What is claimed is:

1. An optical body comprising:
   (a) a multilayer film having a reflecting band positioned to reflect infrared radiation of at least one polarization at an incident angle normal to the film, said reflecting band having a short wavelength bandedge $\lambda_{a0}$ and long wavelength bandedge $\lambda_{b0}$ at a normal incident angle, and a short wavelength bandedge $\lambda_{a\theta}$ and long wavelength bandedge $\lambda_{b\theta}$ at a maximum usage angle θ, wherein $\lambda_{a\theta}$ is less than $\lambda_{a0}$ and $\lambda_{a0}$ is selectively positioned at a wavelength greater than about 700 nm; and
   (b) at least one component which at least partially absorbs or reflects radiation in the wavelength region between $\lambda_{a\theta}$ and $\lambda_{a0}$ at a normal angle of incidence.

2. The optical body of claim 1 wherein said multilayer film is dielectric.

3. The optical body of claim 1 wherein at least one layer of said multilayer film comprises a metal or metal oxide.

4. The optical body of claim 1 wherein said at least one component also at least partially absorbs or reflects radiation in the wavelength region between $\lambda_{b\theta}$ and $\lambda_{b0}$ at a maximum usage angle θ.

5. The optical body of claim 1 further comprising another component which at least partially absorbs or reflects radiation in the wavelength region between $\lambda_{b\theta}$ and $\lambda_{b0}$ at a maximum usage angle θ.

6. The optical body of claim 1 wherein said at least one component partially absorbs or reflects at $\lambda_{a\theta}$ or greater where $\lambda_{a\theta}$ is 700 nm or greater at the maximum usage angle θ.

7. The optical body of claim 1 wherein said at least one component is separate from the film and comprises a dye or pigment.

8. The optical body of claim 1 wherein said at least one component is part of the film and comprises a dye or pigment.

9. The optical body of claim 1 wherein said at least one component is a pigment comprising copper phthalocyanine.

10. The optical body of claim 1, wherein each of the layers of the multilayer film is optically isotropic.

11. The optical body of claim 1, wherein at least some of the layers of the multilayer film are birefringent.

12. An optical body for absorbing or reflecting radiation over a range of wavelengths defined by a lower wavelength edge, the optical body comprising:
    (a) a multilayer film having a normal incidence reflection band that is defined by reflection of radiation of at least one polarization at an incident angle normal to the multilayer film, wherein the normal incidence reflection band is within the range of wavelengths; and (b) at least one additional component that at least partially absorbs normally incident radiation in a wavelength region between the normal incidence reflection band of the multilayer film and the lower wavelength edge of the range of wavelengths.

13. The optical body of claim 12, wherein the at least one additional component is separate from the multilayer film and comprises a dye or pigment.

14. The optical body of claim 12, wherein the at least one additional component is part of the multilayer film and comprises a dye or pigment.

15. The optical body of claim 12, wherein said multilayer film is dielectric.

16. The optical body of claim 12, wherein at least one layer of said multilayer film comprises a metal or metal oxide.

17. The optical body of claim 16, wherein the metal or metal oxide at least partially absorbs normally incident radiation in a wavelength region between the normal incidence reflection band of the multilayer film and the lower wavelength edge of the range of wavelengths.

18. The optical body of claim 12, wherein the at least one additional component also absorbs or reflects light at wavelengths higher than the normal incidence reflection band of the multilayer film.

19. The optical body of claim 12, wherein the lower wavelength edge is an infrared wavelength.

20. An optical body for absorbing or reflecting infrared light, the optical body comprising:
   (a) a multilayer film having a normal incidence reflection band that is defined by reflection of infrared radiation of at least one polarization at an incident angle normal to the multilayer film; and
   (b) at least one additional component that at least partially absorbs or reflects normally incident radiation in a wavelength region between the normal incidence reflection band of the multilayer film and 700 nm.

21. An optical body for absorbing or reflecting infrared light, the optical body comprising:
   a multilayer film comprising
   a) a first multilayer segment comprising a plurality of layers and having a reflecting band that reflects at least 90% of infrared light of one polarization over a first wavelength range; and
   b) a trailing segment comprising a plurality of layers, the trailing segment having a reflecting band that reflects light in a second wavelength range that i) extends over at least 50 nm, ii) is adjacent to the first wavelength range, and iii) covers lower wavelengths than the first wavelength range;
   wherein the multilayer film reflects at least 90% of infrared light of the one polarization at the edge of the second wavelength range adjacent to the first wavelength range and reflects no more than 25% of light of the one polarization at the opposite edge of the second wavelength range.

22. The optical body of claim 21, wherein within the second wavelength range, the multilayer film reflects at least 90% of infrared light at the edge of the second wavelength range adjacent to the first wavelength range and reflects no more than 25% of light at the opposite edge of the second wavelength range.

23. An optical body for absorbing or reflecting radiation over a range of wavelengths defined by a lower wavelength edge, the optical body comprising:
   (a) a first multilayer structure comprising a plurality of birefringent layers, the first multilayer structure having a normal incidence reflection band that is defined by reflection of radiation of at least one polarization at an incident angle normal to the first multilayer structure, wherein the normal incidence reflection band is within the range of wavelengths; and
   (b) a second multilayer structure consisting essentially of optically isotropic materials, wherein the second multilayer structure at least partially reflects normally incident radiation in a wavelength region between the normal incidence reflection band of the first multilayer structure and the lower wavelength edge of the range of wavelengths.

24. The optical body of claim 23, wherein the first multilayer structure further comprises a plurality of optically isotropic layers.

* * * * *

UNITED STATES PATENT AND TRADEMARK OFFICE
CERTIFICATE OF CORRECTION

PATENT NO.     : 6,451,414 B1                                           Page 1 of 2
DATED          : September 17, 2002
INVENTOR(S)    : Wheatley, John A.

It is certified that error appears in the above-identified patent and that said Letters Patent is hereby corrected as shown below:

Column 1,
Line 21, delete "." following "Their".
Line 37, delete "08/67;2691" and insert in place thereof -- 08/672,691 --.

Column 4,
Line 8, delete "$\lambda_{BO}$" and insert in place thereof -- $\lambda_{bO}$ --.
Line 24, delete "to" preceding "and".

Column 5,
Line 27, delete "filed" preceding "Suitable".
Line 28, Begin a new paragraph at "Suitable".

Column 6,
Line 25, delete ".111" and insert in place thereof -- .111B --.

Column 7,
Line 28, delete "$n_z$" and insert in place thereof -- $n_z^B$ --.

Column 12,
Line 37, delete "trans4" and insert in place thereof -- trans-4 --.
Line 49, delete "norbomane" and insert in place thereof -- norbornane --.

Column 13,
Line 4, delete "norbomeme" and insert in place thereof --norbornene --.

Column 14,
Line 4, delete "acrylajes" and insert in place thereof -- acrylates --.

Column 16,
Line 22, delete "PETP'Ecdel'" and insert in place thereof -- PET/"Ecdel" --.

Column 21,
Line 30, to the right of the equation, insert -- Equation 5 --.

Column 22,
Line 50, delete "$n_{is}$" and insert in place thereof -- $n_{iz}$ --.

Column 23,
Line 5, delete "Equation 11: $\left|\frac{M_{11}+M_{22}}{2}\right| = \left|\cos(\beta_1)\cos(\beta_2) - \frac{1}{2}\left(\frac{n_{ld}}{n_{lo}} + \frac{n_{lo}}{n_{ld}}\right)\sin(\beta_1)\sin(\beta_2)\right| \geq 1$"

and insert in place thereof

-- Equation 11: $\left|\frac{M_{11}+M_{22}}{2}\right| = \left|\cos(\beta_1)\cos(\beta_2) - \frac{1}{2}\left(\frac{n_{hi}}{n_{lo}} + \frac{n_{lo}}{n_{hi}}\right)\sin(\beta_1)\sin(\beta_2)\right| \geq 1$ --.

UNITED STATES PATENT AND TRADEMARK OFFICE
CERTIFICATE OF CORRECTION

PATENT NO.    : 6,451,414 B1
DATED         : September 17, 2002
INVENTOR(S)   : Wheatley, John A.

It is certified that error appears in the above-identified patent and that said Letters Patent is hereby corrected as shown below:

Column 24,
Line 6, delete "34" and insert in place thereof -- 3-4 --.
Line 9, delete "20" and insert in place thereof -- 2° --.
Line 9, delete "50" and insert in place thereof -- 5° --.
Line 21, delete "M." and insert in place thereof -- e.g. --.
Line 45, delete "opticalcoatings" and insert in place thereof -- optical coatings --.
Line 61, delete "$_1$" and insert -- , --.

Column 26,
Line 49, delete "tetraarylarinium" and insert in place thereof -- tetraarylaminium --.

Column 27,
Line 5, delete "III-1 17" and insert in place thereof -- III-117 --.
Line 6, delete "V-1 30" and insert in place thereof -- V-130 --.

Column 28,
Line 6, delete "tile" and insert in place thereof -- the --.
Line 24, delete "." following "without".

Column 29,
Line 38, delete "refection" and insert in place thereof -- reflection --.

Column 32,
Line 12, delete "silveroated" and insert in place thereof -- silver-coated --.

Column 33,
Line 21, delete "/o" following "100%".
Line 31, delete "RD.S." and insert in place thereof -- R.D.S. --.

Signed and Sealed this

Eighth Day of July, 2003

JAMES E. ROGAN
*Director of the United States Patent and Trademark Office*